(12) United States Patent
Bertini et al.

(10) Patent No.: US 6,489,554 B1
(45) Date of Patent: Dec. 3, 2002

(54) CONNECTIONS AND TERMINATIONS FOR CABLES

(75) Inventors: Glen J. Bertini, Tacoma; Kim Jenkins, Issaquah; Keith Lanan, Renton, all of WA (US)

(73) Assignee: Utilx Corporation, Kent, WA (US)

( * ) Notice: Subject to any disclaimer, the term of this patent is extended or adjusted under 35 U.S.C. 154(b) by 0 days.

(21) Appl. No.: 09/689,296

(22) Filed: Oct. 11, 2000

Related U.S. Application Data

(60) Provisional application No. 60/155,279, filed on Oct. 11, 1999.

(51) Int. Cl.⁷ .................................................. H01R 4/64
(52) U.S. Cl. .................................................... 174/15.6
(58) Field of Search ........................ 439/206, 88, 190, 439/921, 912; 174/15.7, 21 R, 84 C; 29/826, 15.6

(56) References Cited

U.S. PATENT DOCUMENTS

| | | |
|---|---|---|
| 1,846,361 A | 2/1932 | Saylor |
| 2,248,588 A | 7/1941 | Shanklin et al. |
| 2,908,741 A | 10/1959 | Peterson |
| 3,127,467 A | 3/1964 | Toto |
| 3,321,568 A | 5/1967 | Venturelli |
| 3,449,507 A | 6/1969 | Channell |
| 3,649,952 A * | 3/1972 | Harmon ........................ 439/206 |
| 3,732,352 A | 5/1973 | Dima et al. |
| 3,883,208 A * | 5/1975 | Sankey et al. ............... 439/206 |
| 3,961,127 A | 6/1976 | Gear, Jr. et al. |
| 4,202,591 A * | 5/1980 | Borgstrom et al. ......... 439/206 |
| 4,330,681 A | 5/1982 | Gregory |
| 4,545,133 A | 10/1985 | Fryszczyn et al. |
| 4,642,415 A | 2/1987 | Lanfranconi et al. |
| 4,888,886 A | 12/1989 | Eager, Jr. et al. |
| 4,902,092 A * | 2/1990 | Grandy ....................... 350/96.2 |
| 4,946,393 A * | 8/1990 | Borgstrom et al. ......... 439/921 |
| 5,004,865 A | 4/1991 | Krupnicki |
| 5,215,475 A * | 6/1993 | Stevens ....................... 439/206 |
| 5,612,508 A * | 3/1997 | Kasper ....................... 174/15.6 |
| 5,621,841 A * | 4/1997 | Field .......................... 385/113 |
| 5,907,128 A | 5/1999 | Lanan et al. |

FOREIGN PATENT DOCUMENTS

| | | |
|---|---|---|
| DE | 582168 | 7/1933 |
| DE | 1059527 | 6/1959 |

* cited by examiner

Primary Examiner—Neil Abrams
Assistant Examiner—J. F. Duverne
(74) Attorney, Agent, or Firm—Christensen O'Connor Johnson Kindness PLLC

(57) ABSTRACT

A method and apparatus for connecting flow-through cables. Flow-through cables have a conduit or a plurality of conduits longitudinally placed inside the cable to allow fluid passage. Special terminators, joints, and methods for installing these devices are described herein. One method for connecting two flow-through cables involves: inserting a tubing material into the conduit of one flow-through cable, placing a crimp connector over the cable's conductive core and crimping the crimp connector. The tubing material is then placed into the conduit of the second flow-through cable, the cables are aligned, and then the crimp connector is fastened to the conductive core of the second flow-through cable. The termination assembly includes a rigid tubing material, a hollowed plug assembly that includes a single or a plurality of rigid tubes, a tubing connector connected to the single or plurality of rigid tubes, and a conductive terminator that has a cavity adapted to anchor a cable's conductive core and allow a flexible tubing material to attach to the single or plurality of rigid tubes while being routed through the conductive terminator.

41 Claims, 15 Drawing Sheets

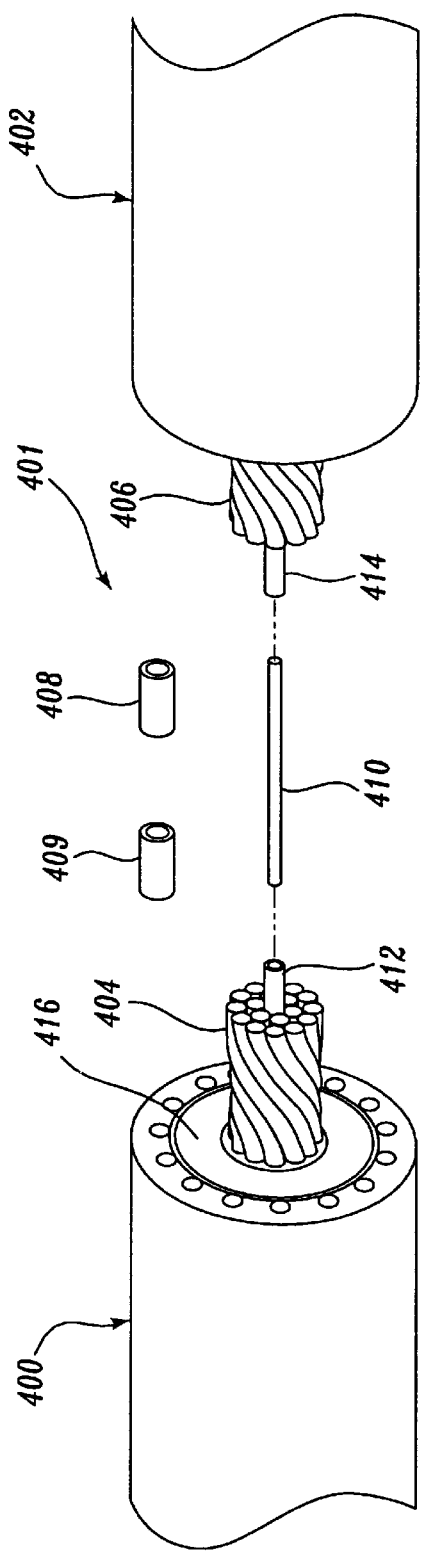
Fig. 3A.
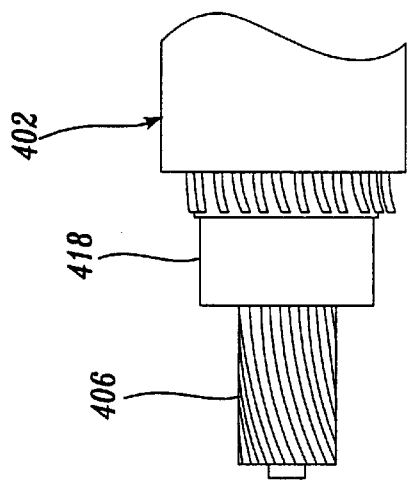
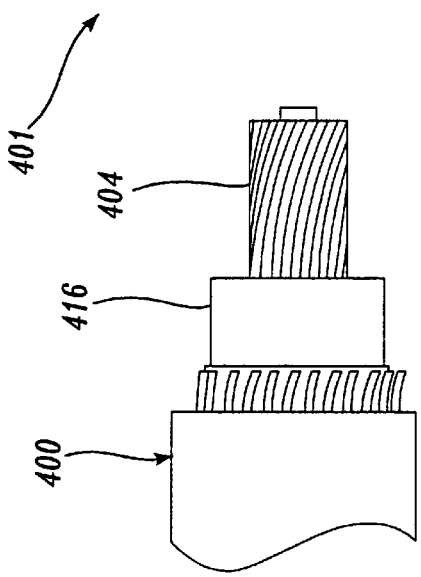
Fig. 3B.

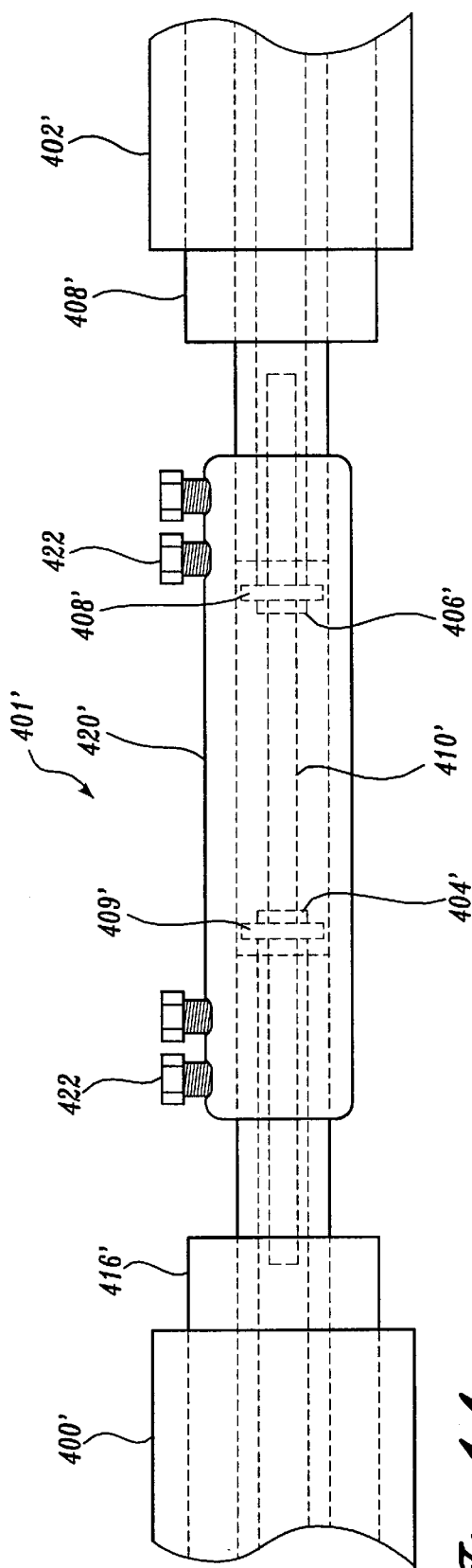
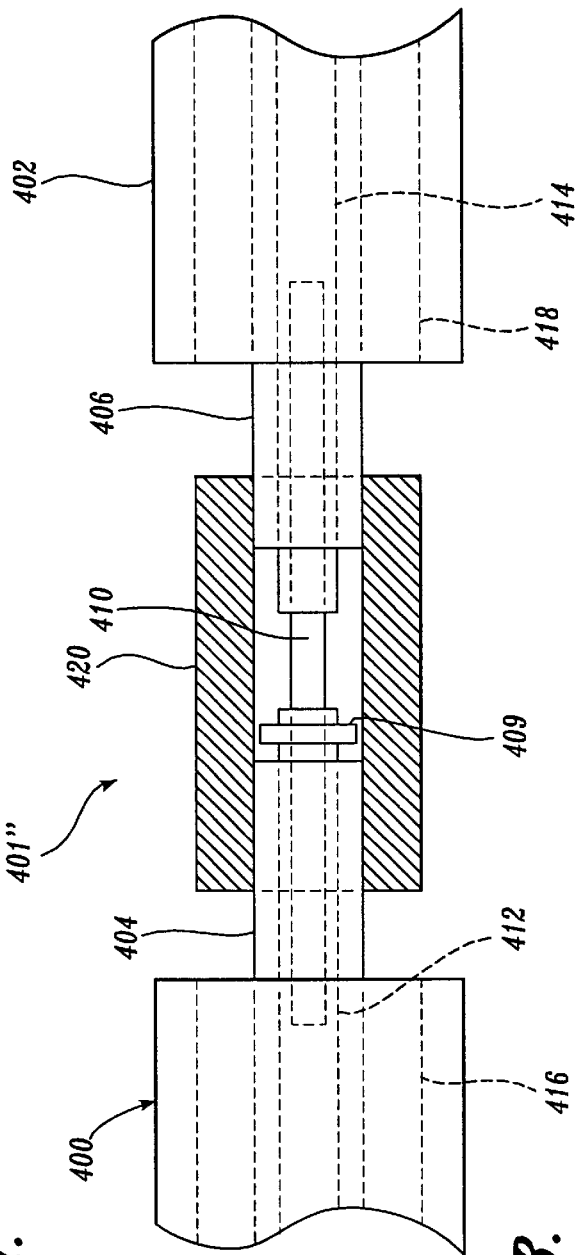
Fig. 4A.
Fig. 4B.

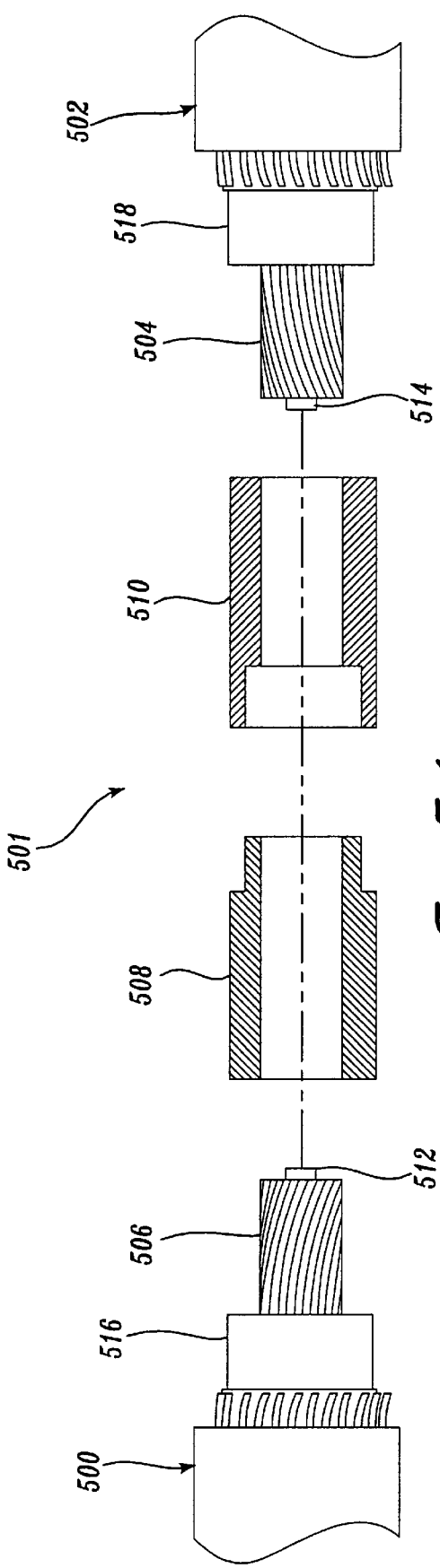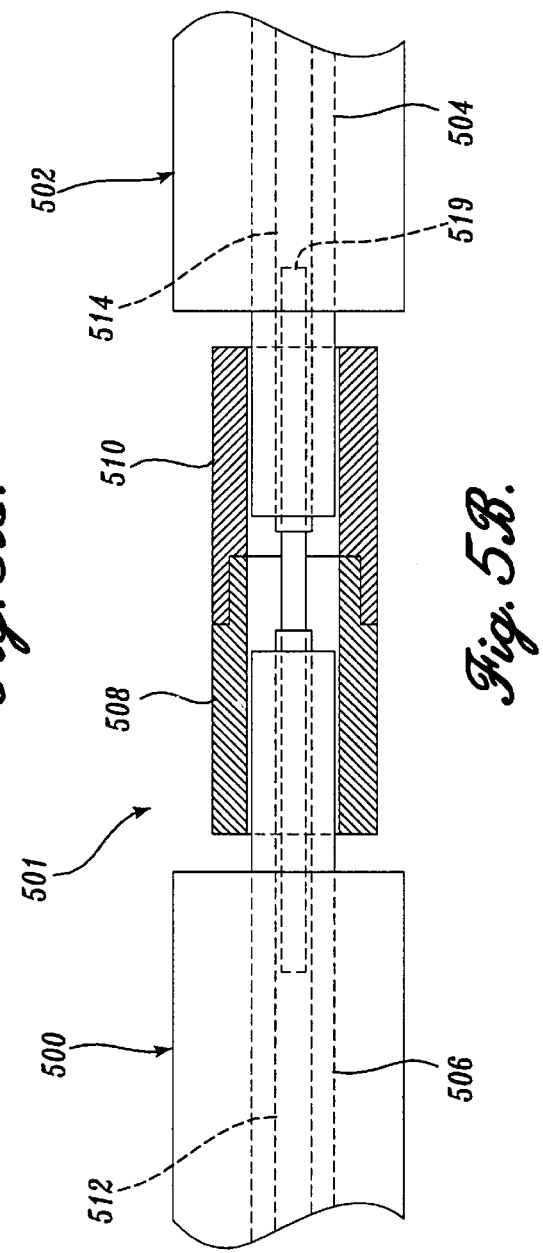
Fig. 5A.
Fig. 5B.

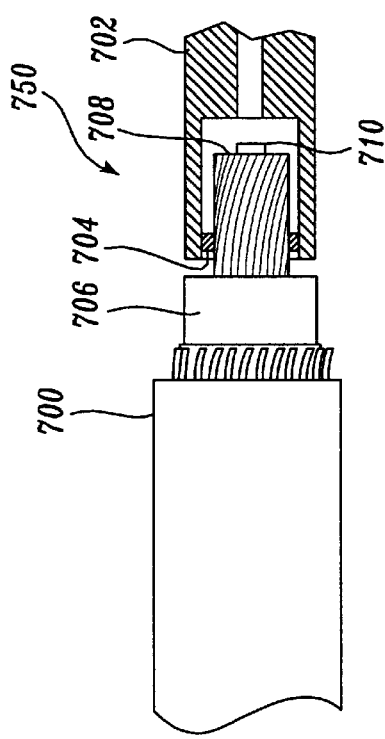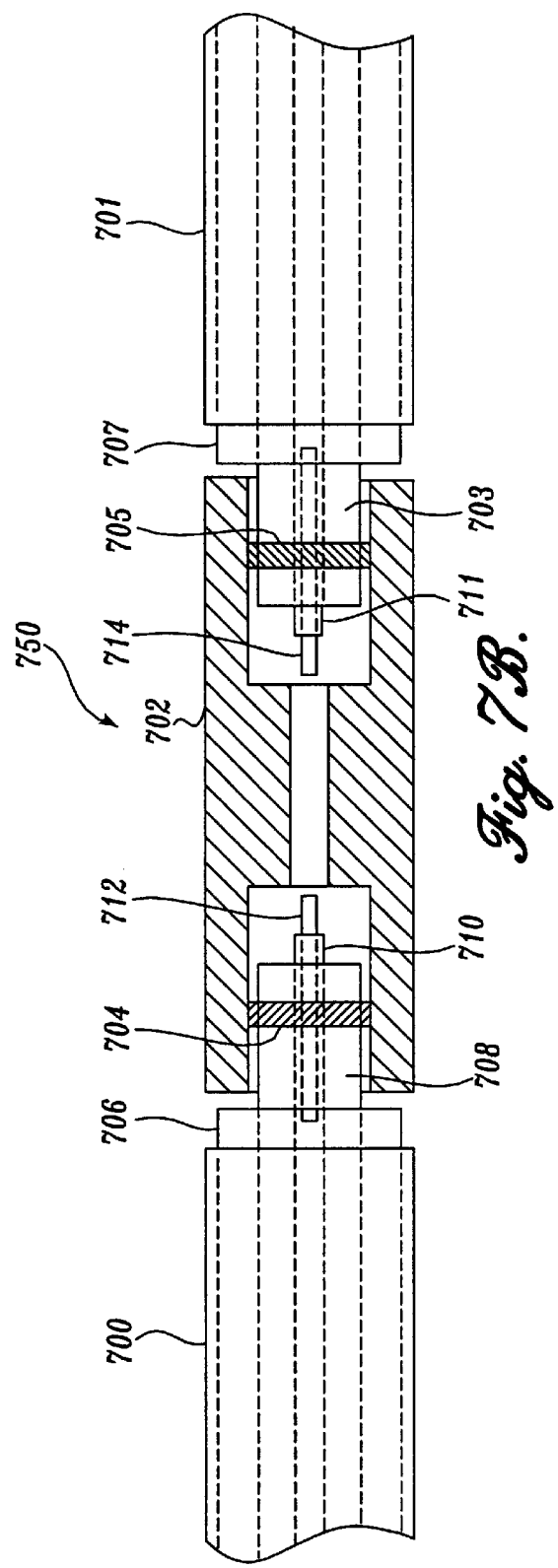

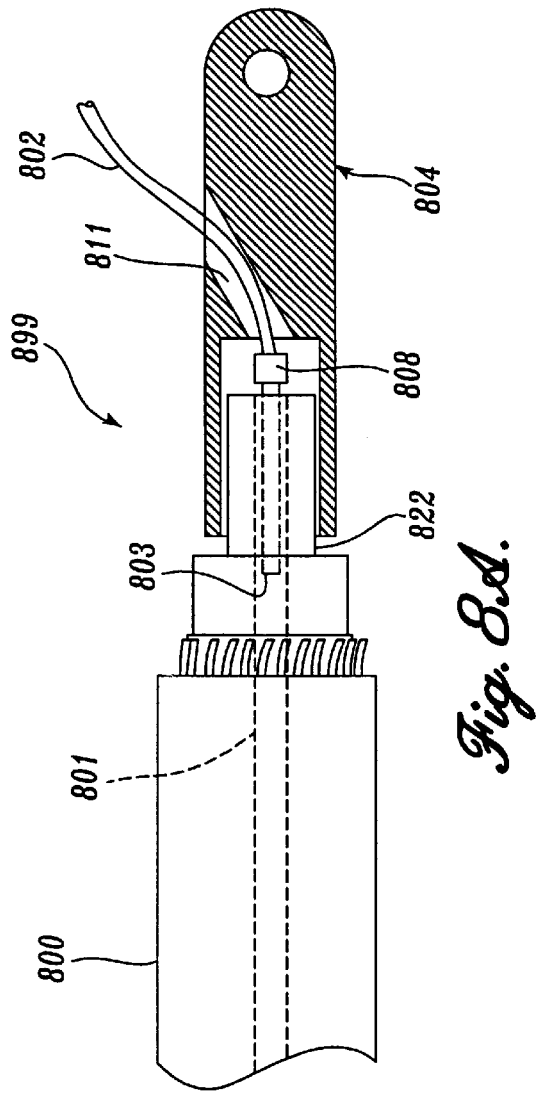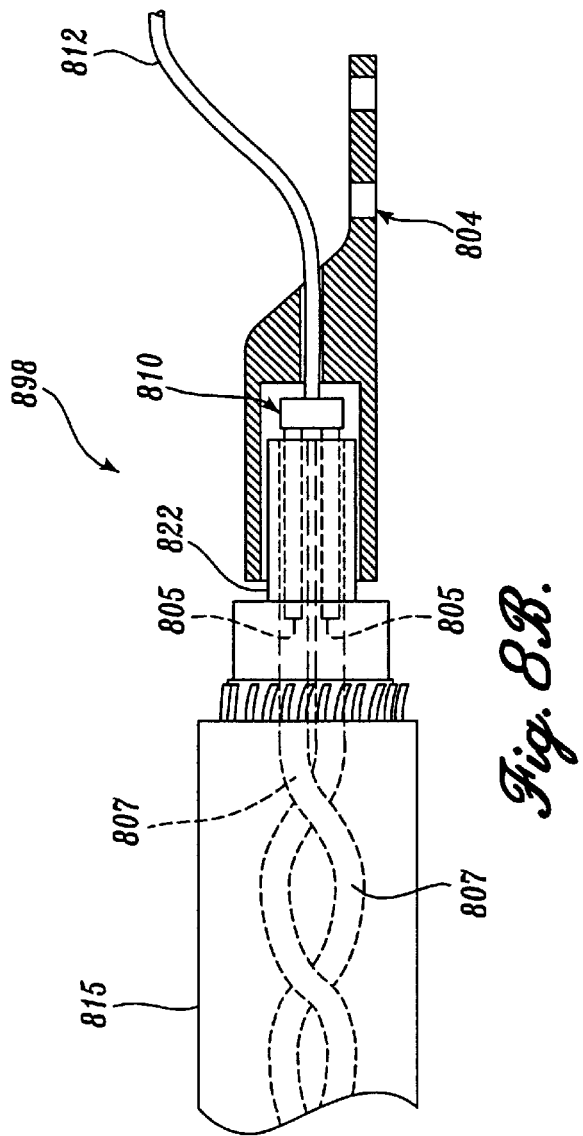
Fig. 8A.
Fig. 8B.

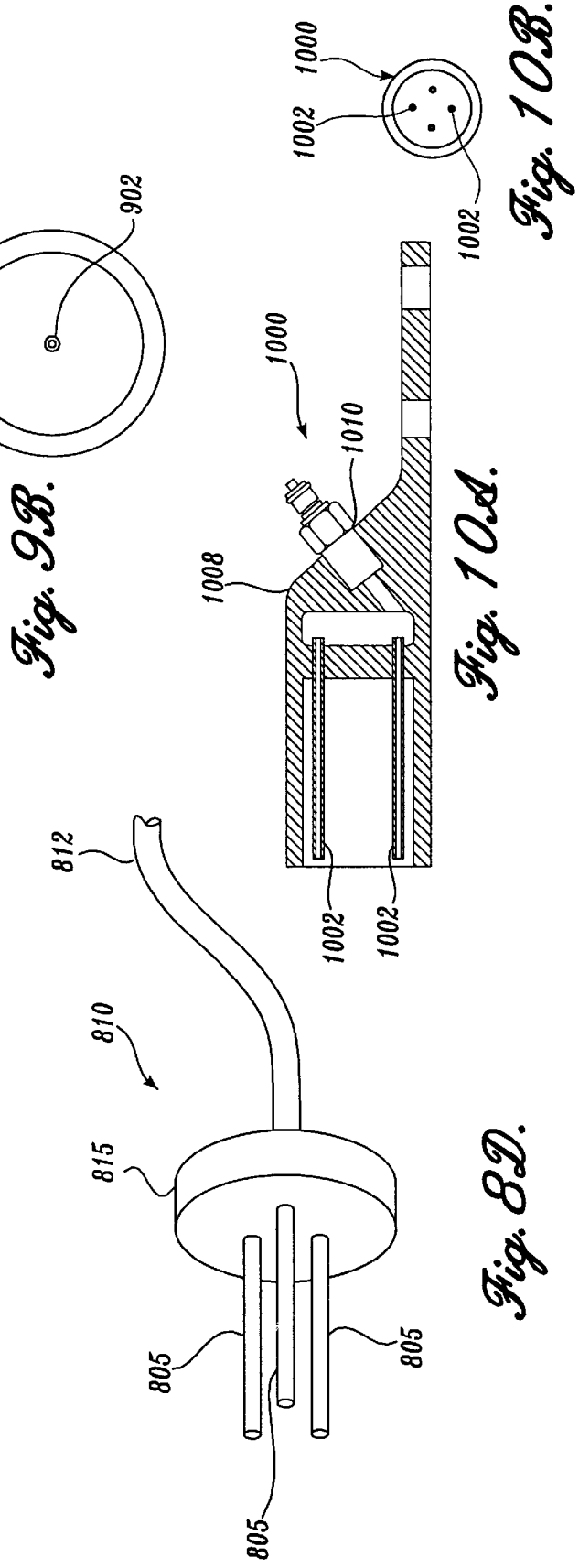

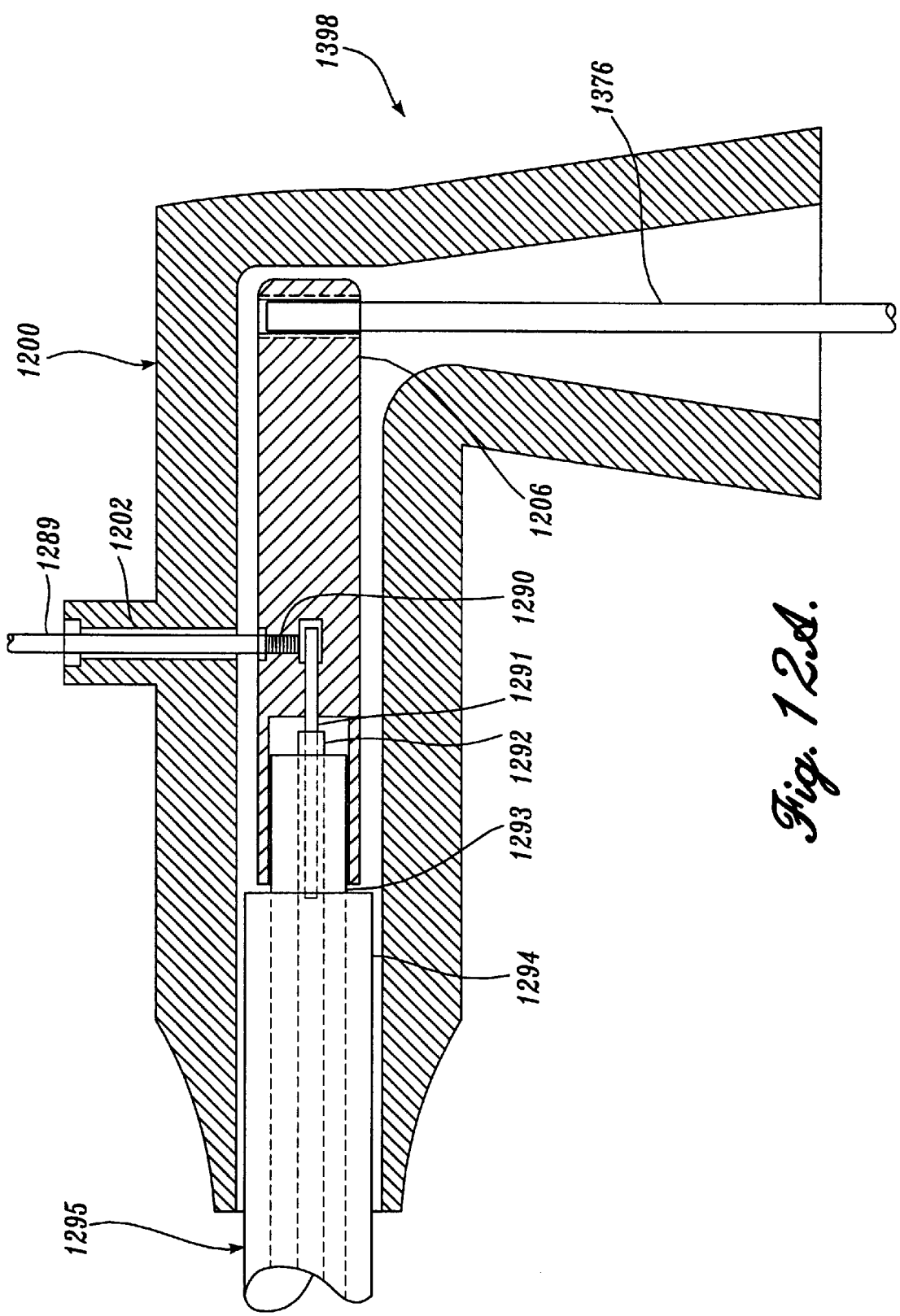

CONNECTIONS AND TERMINATIONS FOR CABLES

CROSS-REFERENCE TO RELATED APPLICATIONS

This nonprovisional patent application claims the benefit under 35 U.S.C. § 119(e) of U.S. Provisional Application No. 60/155,279, filed Oct. 11, 1999, entitled "CONNECTIONS AND TERMINATIONS FOR CABLES." The subject matter of which is specifically incorporated herein by reference.

FIELD OF THE INVENTION

The present invention relates generally to cable connectors and terminators, more particularly, to connectors and terminators for flow-through cables.

BACKGROUND OF THE INVENTION

Typical underground electrical cables include a number of copper or aluminum strands surrounded by a semiconducting or insulating strand shield, a layer of insulation, and an insulation shield. This design of underground cables is known for having a useful life of 25–40 years. In some instances, the life span of an underground cable is shortened when water enters the cable and forms micro-voids in the insulation. These micro-voids spread throughout insulation in a tree like shape, these collections of micro-voids are also called water trees.

Water trees are formed in the insulation when medium to high voltage alternating current is applied to a polymeric dielectric (insulator) in the presence of water and ions. As water trees grow, they compromise the dielectric properties of the polymer until the insulation fails. Many large water trees initiate at the site of an imperfection or a contaminant, but contamination is not a necessary condition for water trees to propagate.

Water tree growth can be eliminated or retarded by removing or minimizing the water or ions, or by reducing the voltage stress. Another approach requires the injection of dielectric enhancement fluid into interstices located between the strands of cables. Certain cables may include at least one dedicated conduit to aid the injection of a dielectric enhancement fluid into the interstices between the strands of cables. The fluid reacts with water inside the cable and oligomerizes to form a fluid with dielectric enhancement properties. The oligomerized fluid functions as a water tree retardant and provides other beneficial properties. Flow-through cables having a dedicated conduit to enhance the flow of the dielectric fluid through the length of the cable advance this injection technique.

Splicing and terminating flow-through cables is a difficult task. The use of these special cables is not widespread and conventional terminators do not offer effective solutions for connecting or terminating flow-through cables. One problem with using traditional cable connectors and terminators is the loss of the fluidic transfer capability when a connector clamps down on a conductive core. According to the present invention, fluidic transfer capability means having the capability to transfer both gas and liquid. In addition, traditional methods do not protect the conduits in the cable from contaminants during installation.

One example of a cable fluid injection sleeve that accommodates fluidic transfer in traditionally used cables is disclosed in the U.S. application Ser. No. 09/085,385, titled: Cable Fluid Injection Sleeve, the disclosure of which is hereby incorporated by reference. The subject matter disclosed in this reference offers several solutions for injecting fluidic material into a cable. However, this apparatus cannot be effectively used with a flow-through cable having one or more fluidic conduits. Like other terminators and connectors, this apparatus does not focus on the preservation of the fluid conduit opening at the end of the cable.

Therefore, as described above, a need exists for an efficient method to inject fluid into a flow-through cable. Moreover, devices and methods are needed to connect and terminate flow-through cables to preserve their fluidic transfer capability and to preserve the capability of injecting a fluidic material in a flow-through cable without having to disconnect the cable.

SUMMARY OF THE INVENTION

The present invention relates to methods and apparatuses for connecting flow-through cables. Flow-through cables have a conduit or a plurality of conduits longitudinally placed inside the cable to allow fluid passage. More specifically, the present invention provides several embodiments of joints and terminators for connecting and anchoring flow-through cables. The joints and terminators of the present invention provide electrical or optical communication in a conductor as well as a flow path that allows fluid to flow through the cable without leaking.

In one embodiment, a method for connecting two flow-through cables includes inserting a tubing material into the conduit of one flow-through cable, placing a crimp connector over the cable's conductive core and crimping the crimp connector. The tubing material is then placed into the conduit of the second flow-through cable, the cables are aligned, and then the crimp connector is fastened to the conductive core of the second flow-through cable.

The termination assembly includes a rigid tubing material, a hollowed plug assembly that includes a single or a plurality of rigid tubes, a tubing connector connected to the single or plurality of rigid tubes, and a conductive terminator that has a cavity adapted to anchor a cable's conductive core and allow a flexible tubing material to attach to the single or plurality of rigid tubes while being routed through the conductive terminator.

In another embodiment, the method for joining two flow-through cables includes the splicing method, as describe above, utilizing a two-part connector. In this method, the tubing material is inserted into the conduit of the first flow-through cable and then withdrawn from the first cable as it is fed into the joining flow-through cable. The two-part connector is fastened to the conductive cores either one piece at a time, or together after the two conductive cores are joined.

The present invention provides efficient solutions for injecting a dielectric enhancing substance into flow-through cables. Specifically, the devices and methods of the present invention allow an operator to achieve fluid and gas injections into flow-through cables without the need to remove the cable from an attached terminator or connector. The designs provide safe injection access to the cable conduit even while the cable is energized with an electrical charge. Further, the terminators and connectors of the present invention also allow for perpetual rejuvenation of the flow-through cables. A flow-through cable can be repeatedly or continuously injected over the lifetime of the cable.

The present invention provides several mechanisms that allow an operator to inject flow-through cables using a high injection pressure without a high risk of fluid or gas leakage.

The design of the connectors and terminators allow the injection pressure to operate up to the maximum pressure of the flow-through cable conduit.

The present invention provides economical and efficient methods of cable connection and termination. The methods and devices in the present invention protect the conduit from contaminants during the installation. Further, the methods and devices of the present invention prevent the conduit from rupturing or collapsing.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3A is a perspective view of one embodiment of a splice joint and two flow-through cables having a single strand conduit;

FIG. 3B is a side view of a one-piece connector of the splice joint depicted in FIG. 3A;

FIG. 5A is a side view of a two-piece connector and two flow-through cables;

FIG. 5B is a side view of a fully assembled splice joint utilizing a two-piece connector;

FIG. 8A is a side view of a termination device connected to a flow-through cable having a center strand conduit;

FIG. 8B is a side view of a flow-through cable and a multi-plug assembly connected to a plurality of cable conduits in the cable;

FIG. 8C is a side view of a flow-through cable and a multi-plug assembly;

FIG. 8D is a perspective view of a multi-tube plug assembly;

FIG. 9A is a side view of a bonded single-tube cable terminator;

FIG. 9B is an end view of a bonded single-tube cable terminator;

FIG. 10A is a side view of a bonded multi-tube cable terminator;

FIG. 10B is an end view of a bonded multi-tube cable terminator;

FIG. 12A is a sectional view of an assembled dead-front terminator with a tube bonded to the terminator housing;

DETAILED DESCRIPTION OF THE PREFERRED EMBODIMENT

Figure 1:
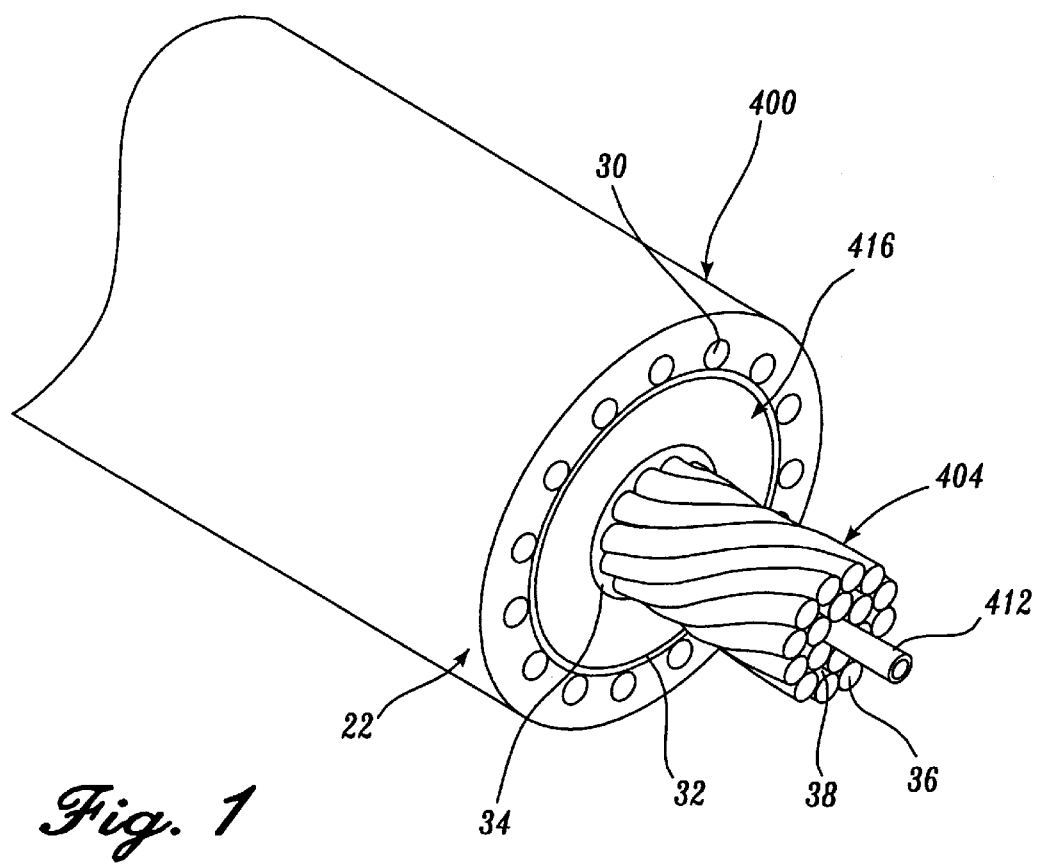
FIG. 1 is a perspective view of a flow-through cable used in accordance with the present invention.
Figure 2:
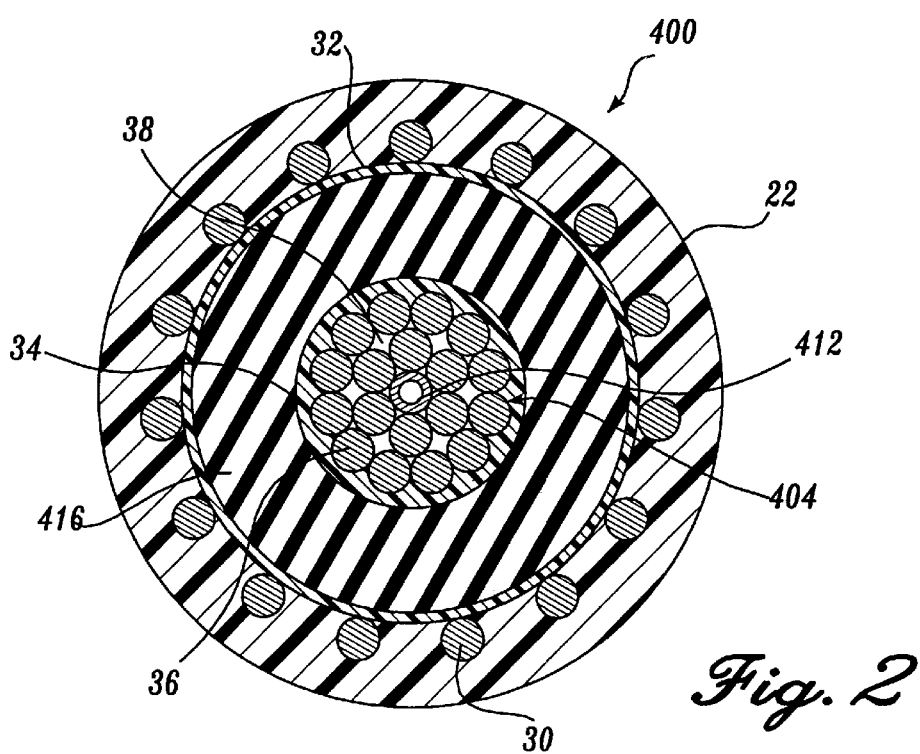
FIG. 2 is a cross-sectional end view of a flow-through cable.

FIGS. 1 and 2 illustrate a flow-through cable for transmitting information (hereinafter "cable 400"). The cable 400 includes a jacket 22, an insulation layer 416, a conductive core 404, and a conduit 412. The cable 400 illustrated in FIGS. 1–2 is illustrated as a multiple conductive strand, 1/0-power cable, such as a medium voltage cable that carries between 5,000 and 35,000 volts. Even though a power cable is illustrated in this example, it should be apparent that the flow-through cable design may be applied to other uses, such as low voltage power cables, transmission voltage power cables, control cables, and communication cables including conductive pair, telephone, and digital communication. Thus, it should be apparent that within the meaning of the present invention, a cable for transmitting information includes not only electric cables, but also light transmitting cables.

The jacket 22 is suitably an elongate tubular member formed from a polyethylene material, PVC, or other polymers known in the art. As is well-known in the art, a plurality of longitudinally extending conductive neutral wires 30 are embedded within and extend the length of the jacket 22. In this version of the flow-through cable, a total of 15 conductive neutral wires 30 are disposed circumferentially around the insulation layer 416.

The insulation layer 416 is suitably formed from a high molecular weight polyethylene (HMWPE) polymer, a cross-linked polyethylene (XLPE), an ethylene-propylene rubber (EPR) or other solid dielectrics, wherein each may include water tree retardants, fillers, anti-oxidants, UV stabilizers, etc. The insulation layer 416 is coaxially disposed within the jacket 22 and extends the length of the jacket 22. Disposed around the perimeter of the insulation layer 416 is an insulation shield 32.

The insulation shield 32 is suitably formed from a compound that includes polyethylene or a similar material and extends the length of the jacket 22. Preferably, the insulation shield 32 is disposed between the outside perimeter of the insulation layer 416 and the plurality of conductive neutral wires 30.

The conductive core 404 is coaxially received within the insulation layer 416 and is centrally located therein. The conductive core 404 is surrounded by a semiconductive or insulating strand shield 34. The strand shield 34 is suitably formed from a compound that includes polyethylene or a similar material and surrounds the conductive core 404, such that it is disposed between the conductive core 404 and the insulation layer 416.

The conductive core 404 includes a plurality of electrically conductive strands 36. The conductive core 404 may also be made from a single conductive strand of metal. Suitably, the strands 36 are formed from a copper, aluminum, or other conductive material. As known in the art, a conductive core 404 is generally made of several wound strands, ranging from 7 to 61 strands in one cable. As a non-limiting example, the conductive core 404 illustrated in FIGS. 1 and 2 is has a total of 18 wound strands.

Still referring to FIGS. 1 and 2, the conduit 412 will now be described in greater detail. The conduit 412 is formed from a chemically permeable material, such as plastics, sintered metals or fiber resin composites in plastic. Suitable plastics include TEFLON®, and NYLON®. Suitable fiber resin composites include KEVLARO®. The conduit 412 has sufficient physical strength to be incorporated in the stranding operation and sufficient thermal properties for use in maximum and minimum thermal environments in which the cable 400 may be manufactured or used. Preferably, the conduit 412 has the thinnest wall possible to allow compound storage and free flow, is permeable, and can withstand operating and emergency overload design temperatures of 130° C. or greater. As a non-limiting example, the wall thickness of the conduit 412 is suitably between $1/64$ and $1/32$ of an inch. Although a cylindrical or nearly cylindrical geometry is the preferred geometry for the conduit 412, it should be apparent that other hollow geometries are also included within the scope of the present invention.

As received within the conductive core 404, the conduit 412 provides a centrally located, unobstructed and longitudinally extending conduit through the length of the cable 400. The conduit 412 is adapted to permit a liquid or gas compound to flow therethrough. Preferably, the conduit 412 carries an insulation restoration fluid, such as CABLECURE®/XL, a mixture of phenylmethyldimethoxysilane fluid together with other components or ethoxy or propoxy equivalents. Such insulation restoration fluids are injected into the conduit 412 and diffuse through the permeable material of the conduit 412 and into the insulation to increase the dielectric properties of the insulation, as described in greater detail below.

As noted above, the conduit 412 may also carry a gas or desiccant liquid through the length of the cable 400 to keep the cable 400 dry by removing water or other permeable contaminants. As non-limiting examples, such gas or liquids include dry nitrogen, dry air, dry SF6, anhydrous alcohols, or other anhydrous organic liquids that are mutually soluble with water. Further, the conduit 412 may be injected with a tracer fluid to aid in the identification of a fault or hole in the cable 400. As a non-limiting example, such tracer fluids include, in pure forms or mixtures, helium, SF6, methane, ethane, propane, butane or any other gas that is detectable with a hydrogen ion detector or a carrier gas, such as nitrogen and a mercaptin. Thus, the conduit 412 creates a continuous flow path of permeable membrane to deliver a fluid or gas into the cable 400 along its entire length. The conduit 412 can deliver either a fluid or a gas to enhance and prolong the dielectric strength of the insulation layer, or to enhance other cable properties, such as a corrosion inhibitor, plasticizer, and or an anti-oxidation agent.

In operation, the restoration compound is injected and permitted to flow-through the conduit defined by the conduit 412. As the restoration compound flows through the length of the conduit 412, the restoration fluid diffuses through the permeable material of the conduit 412 and disperses into interstitial space 38 extending between the strands 36 of the conductive core 404. It should be apparent that the interstitial space 38 may be filled with a strand fill material, such as polyisobutylene. Preferably, the interstitial space 38 is filled with a strand fill material. The restoration fluid diffuses into the insulation layer 416 through the conductor shield 34. The restoration fluid chemically combines and oligomerize with any water molecules within the cable 400, thereby increasing the dielectric strength of the insulation. Flow-through cables have a variety of methods to allow fluid to flow through them, including a conduit in the center, multiple conduits in the interior of the strands of the cable, multiple conduits on the exterior of the strand layer of the cable, conduits in the insulation shield, conduits in the strand shield, conduits outside the insulation shield and inside the jacket, using a hollow conductor shield as the conduit, or injecting in the jacket annulus or injecting under a metallic shield. The cable design using a metallic shield utilizes copper tape in place of the neutral wires 30. These methods are referred to collectively as conduit-in-cable. A more detailed description may be found in U.S. patent application Ser. No. 09/390,967, filed on Sep. 7, 1999, the disclosure of which is hereby incorporated by reference.

The present invention provides several embodiments for joining and terminating the above-described flow-through cables. A joint assembly, also known as a splice, securely fastens two flow-through cables while allowing fluidic communication between the internal conduits of each flow-through cable, and providing electronic or optical communication between the cores of each flow-through cable. A termination assembly provides a mechanism for securely fastening a flow-through cable to a fixed body, such as a transformer. The termination assembly also provides external access to the internal conduits of the flow-through cable while providing external electronic or optical communication with the cores of the flow-through cable.

Figure 3C:
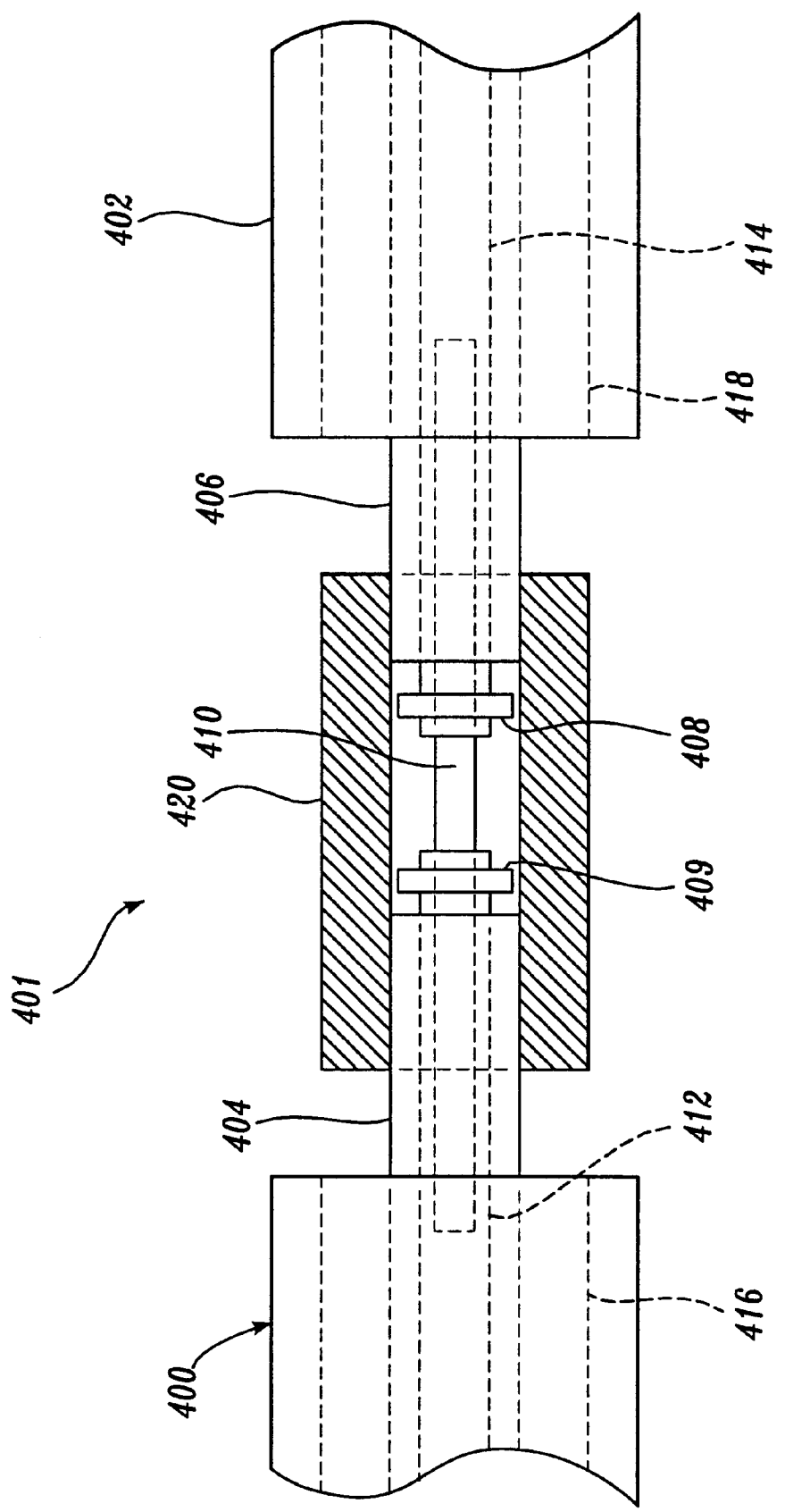
FIG. 3C is a side cross-sectional view of an assembled splice joint utilizing a one-piece connector.

As may be best seen by referring to FIGS. 3A–3C, at least two sections of cable may be joined by joint assembly 401. The joint assembly 401 includes two cables 400 and 402 having conduits 412 and 414, a tube 410, two collars 408 and 409, and a connector 420 that is crimped around the conductors 404 and 406 to hold them in place. Although a connector that is crimped around the conductors is suitable for the present invention, the invention is not intended to be so limited. For example, the connector 420 can be substituted with any mechanical device configured to sufficiently affix the two conductors while allowing fluidic and electrical communication.

The tube 410 is suitably formed from a high strength material and is sized to be received by the conduits 412 and 414. The tube 410 may be sealed within the conduits 412 and 414 by two collars 408 and 409, such as a crimp ring, disposed around the outside perimeter of the interface between the conduits 412 and 414 and the tube 410. Alternatively, a thermal seal, adhesive seal, or other like materials can be used to secure the tube 410 inside the conduits 412 and 414. Alternatively, a tube having hose barb ends can be inserted into the conduits 412 and 414 to secure the tube inside conduits 412 and 414.

The tube 410 seals the ends of the conduits 412 and 414 thereby preventing contaminants from entering the conduits 412 and 414 and preventing fluids from leaking into the splice or termination. The tube 410 also provides support for the conduit in the region where the conductors 404 and 406 may be compressed. Such compression can cause the conduit 412 and 414 to collapse or rupture. The tube 410 minimizes the risk of the conduit 412 and 414 from being crushed, thereby preserving a significant portion of the conduit's flow-through capability.

The tube 410 is suitably made of steel, a ceramic material, or any other material strong enough to protect the conduit 412 and 414 from being crushed when the conductors 404 and 406 is compressed by the connector 420. The tube 410 is inserted into the conduit 412 and 414 such that it passes the area where the insulation 416 and 418 is stripped from the ends of the conductors 404 and 406. The area of exposed ends of the conductors 404 and 406 is where compressions are made to connect the conductors 404 and 406 to the connector 420.

The connector 420 includes a conductive material and is shaped into a hollowed tube configuration. The connector 420 is suitably formed from aluminum, copper, or any other conductive material with similar strength properties. The hollowed interior of the connector 420 is sized to receive the ends of conductors 404 and 406 of the cables. The connector 420 is also configured such that, when the connector 420 is crimped onto the conductive core ends 404 and 406, the connector 420 holds each of the conductive core ends 404 and 406 in place while creating an electrical connection between each conductive core ends 404 and 406.

Figure 4E:
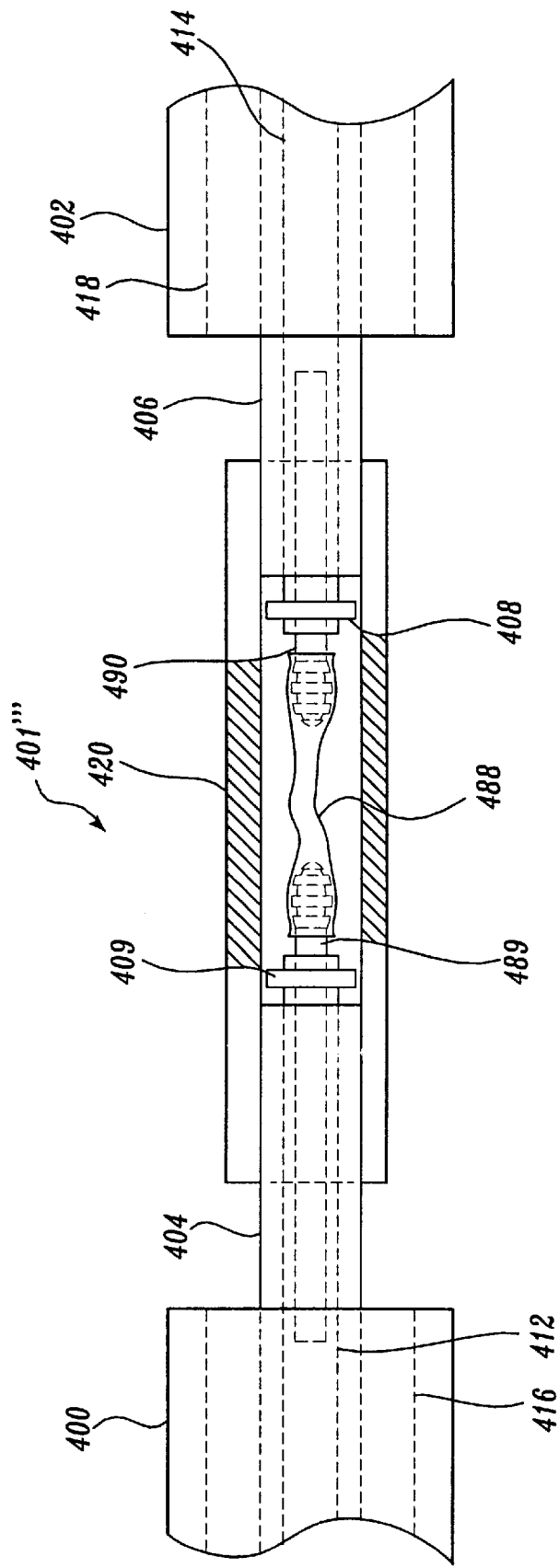
FIG. 4A is a cross-sectional view of a splice joint utilizing a bolt-type connector.
FIG. 4B is a side view of a fully assembled splice joint with only one crimp collar.
FIG. 4C is a side view of a fully assembled splice joint utilizing two sections of rigid tubing and a flexible tubing material.

FIG. 4A illustrates another embodiment of a joint assembly 401' utilizing bolt-type connector 420' for fastening the bolt-type connector 420' to a pair of conductive core ends 404' and 406'. The embodiment of FIG. 4A comprises a similar construction to the splice 401 depicted in FIGS. 3A–3C, except the bolt-type connector 420' utilizes threaded bolts to attach the bolt-type connector 420' to the conductive core ends 404' and 406'. More specifically, the bolt-type connector 420' comprises at least one threaded aperture on the sides of the connector 420', where each aperture is sized and positioned to receive a threaded bolt 422. The threaded bolts 422 are configured and positioned to compress onto the conductive core ends 404' and 406' when tightened thereby holding the core ends 404' and 406' in place.

As described in more detail below, FIGS. 4B and 4C illustrate other embodiments of joint assemblies 401" and 401'" utilizing different tube configurations. Generally described, the joint assembly 401" of FIG. 4B comprises a similar construction as the joint assembly 401 of FIG. 4A, except the joint assembly 401" of FIG. 4B only comprises one collar 409. The joint assembly 401'" of FIG. 4C comprises a similar construction as the joint assembly 401 of FIG. 4A, except the joint assembly 401" of FIG. 4C utilizes two tubes 489 and 490 with hose barb ends and a flexible tube 488.

In accordance with another aspect of the present invention, methods for assembling the above-described joint assemblies 401 are provided. In one embodiment, the method involves the construction of the joint assembly 401 depicted in FIGS. 3A–3C. In this embodiment, the joint assembly 401 is used to attach two flow-through cables 400 and 402, each having at least one conduit 412 and 414 in the conductive core 404 and 406. The method involves inserting a tube 410 into the conduit 412 of the first cable 400. The tube 410 should be inserted into the conduit such that passes through the conduit beyond the area where the insulation 416 is stripped from the conductive core 404. At this point, the tube 410 may be secured to the conduit 412. As described above in reference to FIG. 3A, there are many ways to secure the tube 410 to the conduit 412. As a non-limiting example, a collar 409 may be compressed on the conduit 412 to fasten the tube 410 in place. As mentioned above, the tube 410 can also be secured to the conduit 412 by other mechanisms such as a hose barb tube or conventional seals or adhesives.

A connector 420, suitably formed from a conductive material, is positioned over the conductive core 404 and secured into place. As described above, the connector 420 can be secured onto the conductive core 404 by a crimping method. The tube 410 should be long enough to protrude beyond the connector 420 after the tube 410 and connector 420 are both positioned onto the conductive core 404. This way, when the second cable 402 is aligned with the first cable 400, the tube 410 can be inserted into the conduit 414 before the connector 420 covers the conduit 414. The metal tubing 410 should also be long enough to extend through the exposed portion of the conductive core 404 and 406 on each cable 400 and 402. Once the connector 420 and cables 400 and 402 are properly aligned, the conductive core 406 is inserted into the connector 420 and the connector 420 is then compressed onto the conductive core 406 of the second cable 402.

The method described above, with reference to FIGS. 3A–3C, is best utilized when there are few conduits in the cable and the cable diameter is small. As will be described in more detail below, other methods are provided for splicing larger cables or cables having many conduits. More specifically, the following descriptions of splicing techniques are used to accommodate inflexible flow-through cables.

FIGS. 3A and 3B also illustrate the components utilized in another method for constructing a splice assembly. Like the above-described method, the second method also utilizes a single-piece connector 420. However, in the second method, the insulation 416 of the first cable 400 is stripped back to accommodate the full length of the connector 420. Thus, after the cable insulation is cut back, the connector 420 is slid over the exposed conductive core 404 of the first cable 400. In addition, the tube 410 is inserted into the first conduit 412. Here, a substantial portion of the tube 410 is inserted into the first conduit 412.

After the cables 400 and 402 are aligned, the tube 410 is withdrawn from the first cable 400 as it is inserted into the second cable 402. The tube 410 should be adjusted until the middle of the tube 410 is centered between the two cable ends. At this point, the tube 410 may be secured to the conduits 412 and 414. As a non-limiting example, collars 408 and 409 may be used to fasten the tube 410 in place. The connector 420 is slid from the first cable 400 toward the second cable 402 until the middle of the connector 420 is centered between the two cable ends. Once in place, the connector 420 is then secured to anchor the two conductive cores 404 and 406.

FIG. 3C illustrates a fully assembled joint 401. The tube 410 is inserted into both cable conduits 412 and 414. The connector 420 is affixed to the two conductive cores 404 and 406. As illustrated, the tube 410 is long enough to extend through the exposed portions of the conductive cores 404 and 406 and past the insulation 416 and 418 of each cable. This apparatus prevents the conduits 412 and 414 from being crushed when the connector 420 is compressed on the conductive cores 404 and 406.

Although the connectors described above are shown as a crimping-type connector, where the metal is mechanically compressed to create a seal, it is within the scope of the present invention to include other known connectors. As a non-limiting example, FIG. 4A illustrates another fully assembled joint 401' using a bolt-type connector 420'. This splice assembly 401' is assembled in the same manner using the previous methods described above. One difference between the embodiment of FIG. 4A and the previous embodiment of FIGS. 3A–3C is that the connector 420' is secured to the conductors 404' and 406' with bolts 422 instead of mechanical compression. The connector 420' is suitably formed from aluminum, copper, or any other conductive material with similar strength properties.

FIG. 4B illustrates another configuration of the splice assembly 401. The assembly process is similar to that describing the splice assembly 401 in FIG. 3C, but this process does not include inserting the collar 408. In this embodiment, the tube 410 is held by the mechanical compression of the connector 420 or by another conventional sealant as described above.

FIG. 4C illustrates another configuration of the splice assembly 401'''. The embodiment of FIG. 4C involves the use of two tubes 489 and 490 with hose barb ends and a flexible tube 488 connecting the two tubes 489 and 490. The flexible tubing is made from nylon or other like material. The process of assembling this splice involves inserting the tubes 489 and 490 into the conduits and then securing them in place. The connector 420 is slid over the conduit 404. Next, the tube 488 is connected to the two tubes 489 and 490 and held into place by the hose barbs. The connector 420 is then slid over the conductive cores 404 and 406 of each cable 400 and 402 and then secured into place using one of the crimping or bolt methods as described above. Although this configuration using the flexible tubing 488 is used in the single piece connector 420, this configuration utilizing the flexible tubing 488 can be used in other splice assemblies, such as the two-part connector as shown in FIG. 5A.

Referring now to FIGS. 5A and 5B, another embodiment of joint assembly 501 will now be described in greater detail. The joint assembly 501 shown in FIGS. 5A and 5B utilizes a two-part connector 508 and 510 and a tube 519 that is to be installed in a manner similar to the embodiments described above. When the two halves of the connector are joined together, the total length of the two connector parts is close to the length of the one-piece connector, thereby eliminating the need for an elongated splice as required by the above-described method.

In the construction of the embodiment utilizing the two-part connector, the first half of the two-part connector 508 is slid over the prepared end of the first cable 500 and the other half 510 is slid over the end of the second cable 502. A tube 519 is inserted into the first conduit 512. After the cable ends are aligned, the tube 519 is withdrawn from the first conduit 512 as it is inserted into the second conduit 514. The tube 519 is moved until the middle of the tube 519 is centered between to two cable ends. The two connector halves 508 and 510 are then joined and the entire connector is secured to the conductive cores 506 and 504.

The two connector halves 508 and 510 may be crimped together to preclude their separation. The two connector halves may also be secured by the use of other techniques such as an adhesive, welding, or a threaded connection. The present invention is not limited to threaded connections, as there are many ways to join the two halves of the connector including an interference fit or a twist-lock fit. Even a low tolerance fit can be made permanent and provide the required electrical and thermal connection by the application of a crimp over the male and female portion of the connector halves.

Although the three cable connecting procedures described above only illustrate one end of the cable to be spliced 400, the other end of the cable 400 may be connected to another splice assembly in the same manner as described above. In addition to the procedures described above, another tube (not shown) is connected to the other cable end, and another collar and connector is applied to secure the tube and cable.

By the use of this construction, fluid injection pressure into the cable is sealed and conveyed by the tubes between the two cables that are connected. This construction eliminates the need for the splice or termination to hold injection pressure.

As described above, these splice procedures can be used with a cable having a center strand conduit design. The procedures also apply to cables having outer strand conduits, middle strand conduits, and multi-layer strand conduits. These different types of cables can all be connected inside a splice connector using sealed tubes. The connector, either in the one-piece or two-piece design, can then be crimped or mechanically bonded, and a splice covering can be applied in the conventional way.

Figure 6:
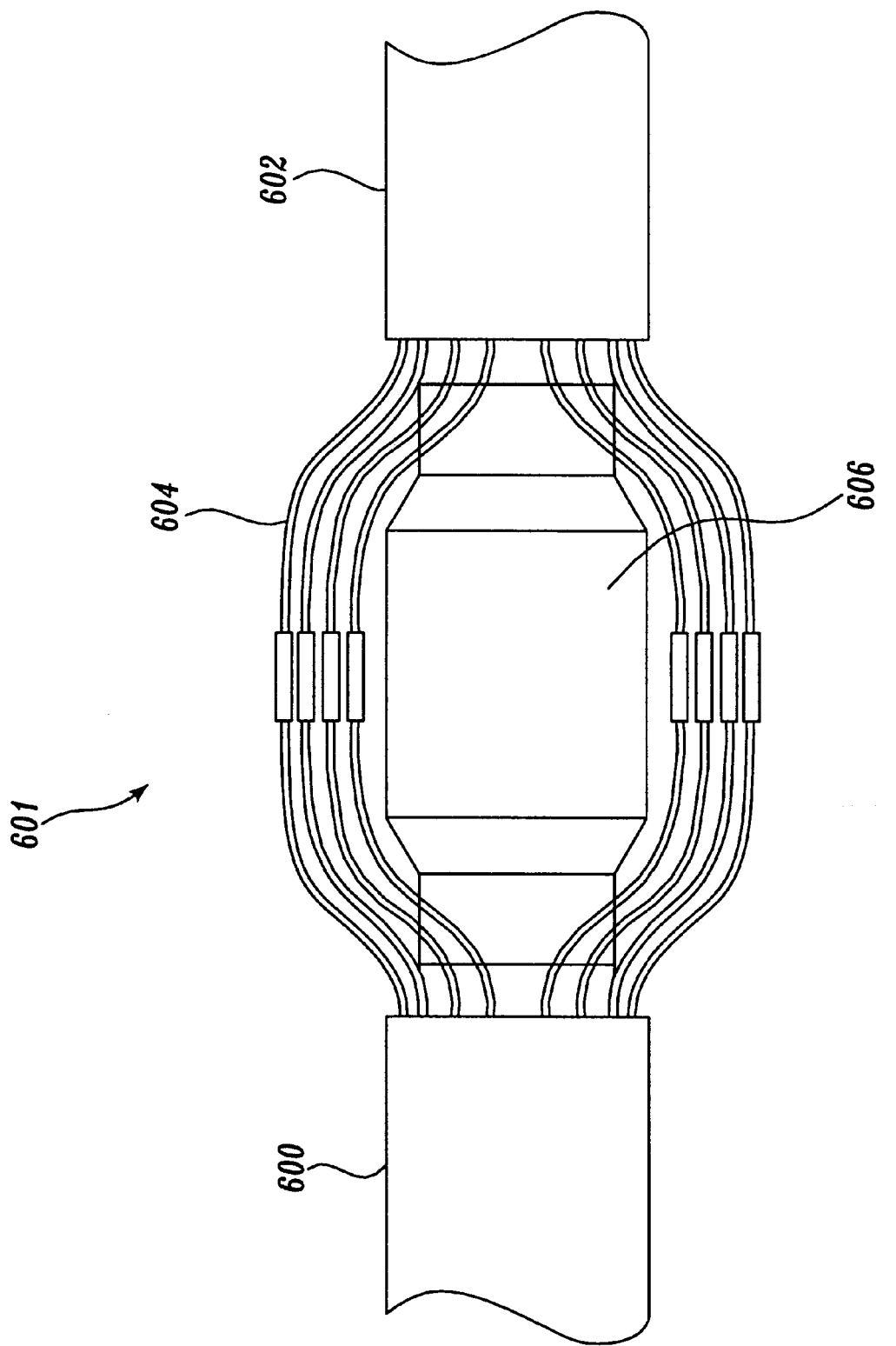
FIG. 6 is a side view of a flow-through cable having a plurality of conduits and neutral wires under the cable insulation.

If the cable has conduits inside the jacket or in the insulation shield, the conduits from both cable ends can be connected in various ways. These connection procedures are similar to the other embodiments described above, involving commercially available couplings and fittings. As illustrated in FIG. 6, these conduits 604 would be joined outside of the insulating splice body 606 in a manner analogous to the way neutral wires are trained around the splice. The entire assembly could optionally be covered with a re-jacketing sleeve (not shown).

Figure 7E:
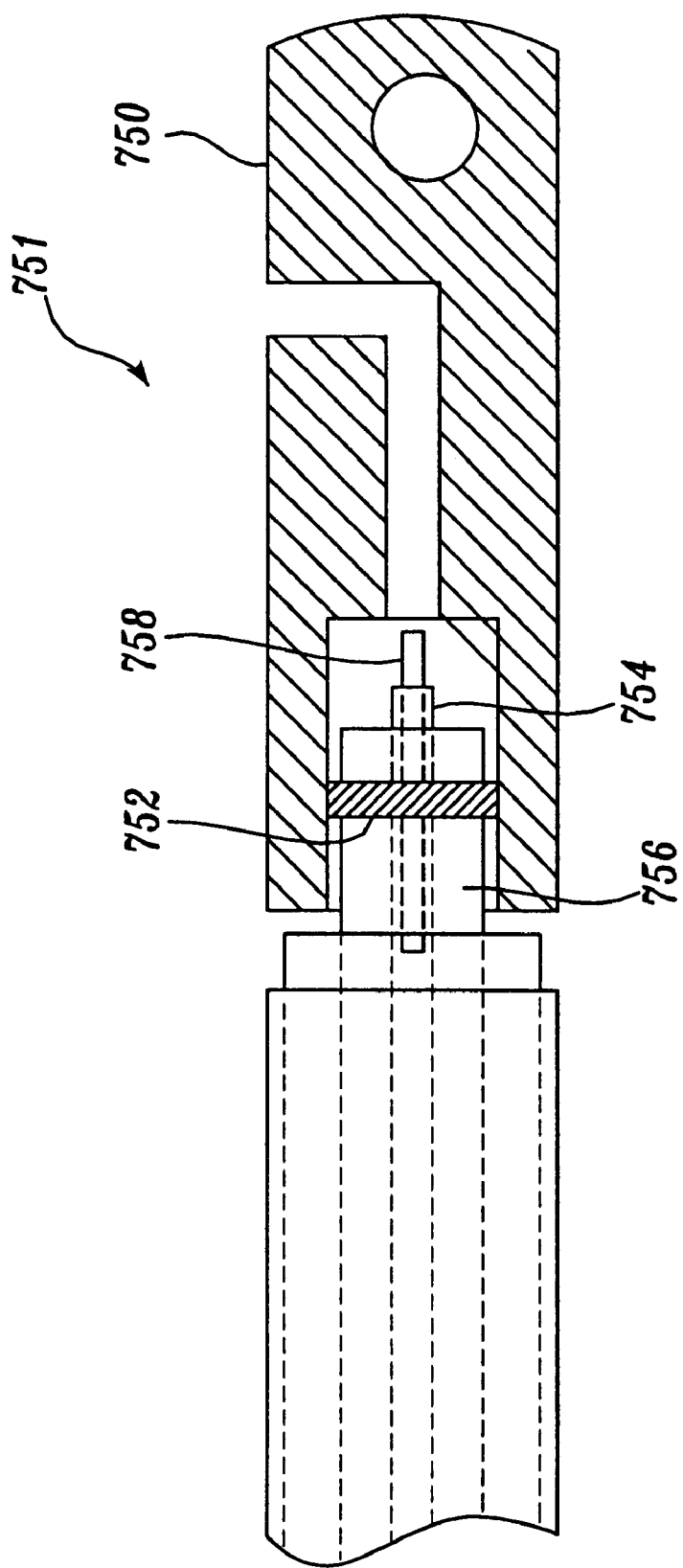
FIG. 7A is a side view of a flow-through cable inserted into a connector with an elastomeric insert.
FIG. 7B is a side view of two flow-through cables inserted into a connector with an elastomeric insert.
FIG. 7C is a side view of a flow-through cable inserted into a terminator with an elastomeric insert.

Referring now to FIGS. 7A and 7B, another embodiment of joint assembly 750 will now be described in greater detail. As described below, the embodiment of FIGS. 7A and 7B is designed for cables that have conduits in the conductor shield or between the electrically conductive strands. Generally described, the embodiment of FIGS. 7A and 7B comprises the structure of the joint assembly 401 of FIG. 3A, where a hollowed cylindrical shaped connector is used to provide sealed fluidic communication between two cable ends. In addition, the embodiment of FIGS. 7A and 7B comprises a connector 702 with an elastomeric insert 704 to create a seal between the cable and the connector 702. More specifically, the elastomeric insert 704 will form a seal between the surface of the conductor 708 and the surface of the connector's cylindrical cavity when the connector is secured in place. This allows the fluid in the conduit 710 to flow into the connector 702 without fluid leaking outside of the seal.

This design using an elastomeric insert 704 has many applications in connecting or terminating cables. For example, FIG. 7B illustrates a cable connector using two elastomeric inserts 704 and 705, two sections of tubing 712 and 714, and a hollow case connector 702. This casing can use a crimp method or other conventional splice methods may be applied to affix the two cables 700 and 701. This design allows the two cable conduits 710 and 711 to exchange a gas or fluid without exposing the insulating splice to fluid contact or pressure. A conventional splice, as shown as item 606 in FIG. 6, may then be applied over the connector 702. The tubing 712 and 714 is used to protect the conduit openings when the connector 702 is secured to the conductors 708 and 703. Although FIGS. 7A and 7B only depict a cable having only one center conduit, this invention also applies to cables having a plurality of conduits in or near the conductive core.

FIG. 7C is an illustration of a terminator using an elastomeric insert 752. In this embodiment, the conduit, conductor, and cylindrical opening of the terminator are all attached using the method as described above with reference to FIGS. 7A–7B. Additional information regarding the terminator is discussed in more detail below.

The present invention also provides several devices and methods for terminating flow-through cables. More specifically, the present invention includes several embodiments for terminating cables while providing external access to the fluidic conduits in the cables. The various embodiments of the present invention provide terminators for live-front devices, terminators with a conductive exposed surface, and dead-front devices, terminators with a non-conductive exposed surface.

As may be best seen by referring to FIGS. 8A–13C, a flow-through cable 800 can be anchored to a terminator 804 while allowing external access to the cable conduit 801. The terminator assembly 899 includes a flow-through cable 800 with a conduit 801, a semi-flexible tube 802 connected to another tube 803, and a terminator 804. The terminator assembly 899 is also configured to provide electronic communication between the cable conductor 822 and the terminator 804.

As shown in FIG. 8A, the one embodiment of the present invention involves the utilization of a semi-flexible tube 802 that is not mechanically bonded or sealed to the termination connector 804. If there is only one conduit 801 in the cable 800, a single tube 803 is inserted into the conduit 801 and routed through a cavity 811 in the terminator 804. The tube 803 can be directly inserted in the conduit 801 and bonded to the conduit 801 with an adhesive. Alternatively, a plug assembly 808 can be used to attach the semi-flexible tube 802 to the conduit 801. FIG. 8A depicts an embodiment using a plug assembly 808 where the semi-flexible tube 802 is connected to a rigid or semi-rigid tubing 803. Much like the assembly depicted in FIG. 4C, the semi-flexible tubing 802 is connected to the rigid or semi-rigid tubing 803 by a mechanical connector or other conventional tube connecting devices.

Another embodiment shown in FIG. 8A involves the utilization of unbonded tubes for a flow-through cable 815 having a plurality of conduits 807. As shown in FIGS. 8B, 8C, and 8D, the plug assembly 810 of this embodiment provides gas and fluid communication between the cable conduits 807 and the semi-flexible tube 812. As shown in FIG. 8D, the plug assembly 810 comprises a hollowed casing 815 that has apertures on one side allowing fluidic communication between a plurality of tubes 805 and the internal section of the hollowed casing 815. On the opposite side of the plug assembly 810 from the plurality of tubes 805, a semi-flexible tube 812 is also attached to the plug assembly 810; where the flexible tube 812 is attached to allow fluidic communication between the flexible tube 812 and the internal section of the hollowed casing 815. The tubes 805 are suitably received by the cable conduit 807 to allow fluidic communication between the cable conduit 807 and the semi-flexible tube 812.

The rigid or semi-rigid tubes 805 are arranged to match the configuration of the cable conduits 807. FIG. 8D illustrates a perspective view of the plug assembly 810. Although this particular embodiment shows a three-tube configuration, this invention relates to configurations with any number of tubes 805. FIGS. 8B and 8C depict a multi-tube plug assembly 810 inserted into the plurality of conduits 807 in the cable 815.

In the configurations of FIG. 8A or 8B, once the tube 812 is connected to the cable conduit, the tube 812 is then passed through a cavity 811 in the connector 804. The tube 812 is exposed on the outside of the connector 804 to provide injection access to the conduit 807 from the tube 812 without requiring a user to remove the cable 815 from the terminator 804 to apply fluid to the cable conduits.

Another embodiment of a flow-through cable terminator is illustrated in FIGS. 9A and 9B. FIG. 9A is a side view of the single-tube cable terminator assembly 900 and FIG. 9B is an end view of the single-tube cable terminator assembly 900. In this configuration, the tube 902, made of a rigid or semi-rigid material, is bonded to the terminator 908. The terminator 908 is made from a conductive material used in common terminators.

As shown in FIG. 9A, the tube 902 should be long enough to extend through the full length of the terminator's cylindrical opening. A long tube 902 that extends past the end of the connector casing 908 facilitates easy cable installation. When the terminator 900 is installed on the end of a flow-through cable, the tube 902 passes into the cable's conduit before the cable end enters the terminator cylindrical opening. The tube 902 is fixed to the casing 908 and configured to only allow fluidic communication between the inner portion of the tube 902 and the port 906.

Much like the configuration of the embodiment of FIG. 8A, a cable conductor is inserted into the terminator 900 and the tube 902 is inserted into the cable conduit. The terminator 900 is also configured to provide electronic communication between the casing 908 and the cable conductor. Once a cable is fixed in the terminator 900, injection access to the cable conduit is allowed through a port 906. The port 906 can be accessed using several commonly known tube connecting techniques, some non-limiting examples include: threaded connectors, injection fittings, valves, or plugs could be fitted to this port.

FIGS. 10A and 10B depict another embodiment of a terminator that involves bonded micro-tubes 1002. The bonded multi-tube terminator 1000 allows injection access to cable conduits (not shown) through a hollowed casing 1008 having a plurality of tubes 1002 with gas and fluid communications to an access port 1010. This configuration is made for cables having multiple conduits in the intermediate or outer layers of the conductor. FIG. 10A is a side view of the multi-tube cable terminator 1000 and FIG. 10B is an end view of the multi-tube cable terminator 1000.

Similar to the single-tube terminator 900, the tubes 1002 are bonded to the terminator casing 1008. The micro-tubes 1002 are also made of a rigid or semi-rigid material. As shown in FIG. 10B, the tubes 1002 are also arranged around the cylindrical opening so they are align with the conduits in a flow-through cable. When the cable is inserted into the terminator opening, the micro-tubes 1002 slide into the conduits in the cable. As a non-limiting example shown in FIG. 10A, access to the flow-path can be through a threaded opening intersecting the cavity where the bonded microtubes 1002 terminate. This will allow direct connection of injection equipment used to apply fluid to the cable conduit. The access port 1010 can be plugged or attached to an external tube (not shown) similar to the techniques described for the access port 906 in FIG. 9A.

Figure 11A:
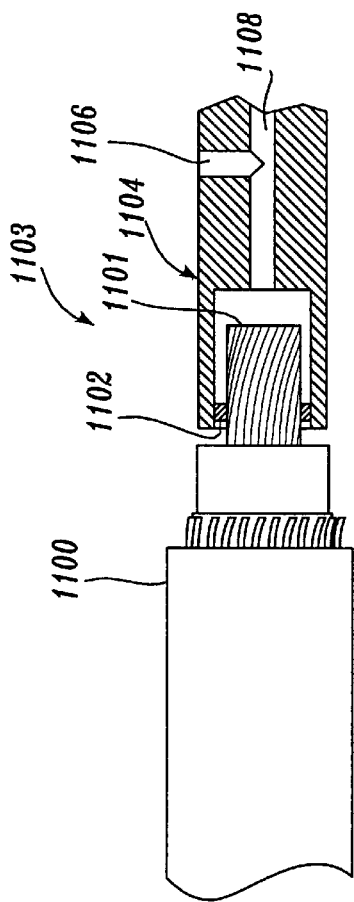
FIG. 11A is a side view of a flow-through cable and a connector utilizing an elastomeric seal.
Figure 11B:
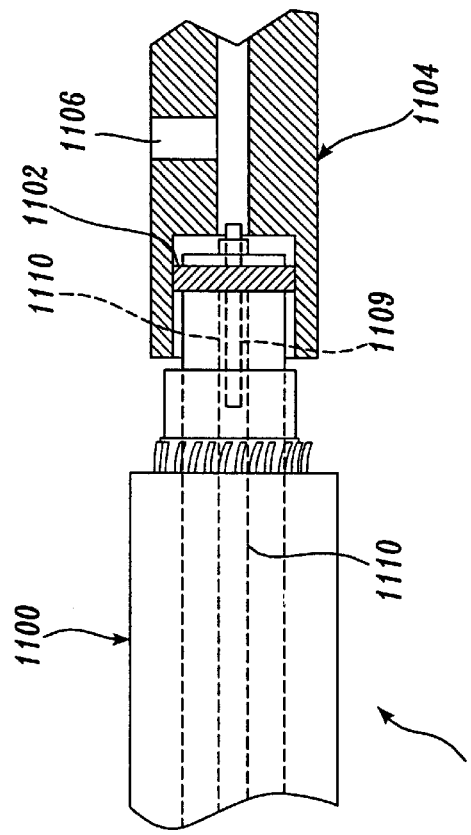
FIG. 11B is a side view of a flow-through cable, a connector, a metal tubing, and several internal cable components.

In yet another embodiment, as shown in FIGS. 11A and 11B, the present invention provides another configuration for terminating a flow-through cable using a circumferential seal 1102 around the conductor strands 1101. As shown in FIG. 11, an elastomeric sealing material 1102 is placed inside the termination connector 1104. Once the cable 1100 is inserted into the connector 1104, the connector 1104 is secured down on the cable to secure the connection. The crimping force applied over the elastomeric material 1102 seals the strands of the cable. This design allows a fluidic communication between conduits in the cable (not shown) and the valves in the terminator 1104. In this embodiment, the valves and openings in the terminator 1104 can be sealed by various devices as shown in the previous embodiments.

This particular non-limiting example illustrates an optional injection access 1106 that can be used in addition to the other injection access 1108. This optional injection access can also be used in other terminators and cable joining apparatuses shown in previous embodiments.

Unlike the previous embodiments, this embodiment utilizing a circumferential seal 1102, which mainly works for strand-filled cables. The termination connector 1104 has a channel leading from the strands to a port that can be connected to injection equipment or may pass through the connector to another cable.

The elastomeric material may either be placed near the end of the strands, as shown in FIG. 1B, or more toward the cable insulation, as shown in FIG. 11A, or at any intermediate point. FIG. 11B illustrates an embodiment of FIG. 11A where a compression resistant tube 1109 is inserted in the conduit 1110 prior to the installation of the connector 1104 to prevent the conduit 1110 from collapsing. This example is similar to the terminator apparatus 751 shown in FIG. 7C.

All of the above-described embodiments readily work in all splices and at most live-front terminations. However, insulated terminations, commonly known as dead-front terminations, require additional components to allow the above-described embodiments to be practically applied. Accordingly, the present invention includes two alternative embodiments that allow the above-described embodiments to be applied to dead-front terminations. Generally described, the above-described terminators shown in FIGS. 9A–10B are fitted with several components to allow fluidic access to shielded terminators.

FIG. 12A is a sectional view of a cable 1295 connected to a dead-front terminator 1398 with a tube 1291 bonded to the terminator housing 1206. This configuration is similar to the terminator configuration shown in FIG. 9A, except this embodiment further comprises a nonconductive protective housing 1200. Generally described, a tube 1291 is inserted into the cable conduit and the tube 1291 is connected to the conductive terminator 1206 such that it is sufficiently fixed into place. At the opposite end of the tube 1291 from the terminator casing 1206, the tube 1291 is inserted into the conduit 1292 and configured to allow fluidic communication between the terminator access port 1290 and the conduit 1292. Injection access can be made through the terminator access port 1290 by the use of an injection tube 1289. The injection tube 1289 can be fixed to the terminator access port 1290 with a thread locking device or other like devices. The terminator access port 1290 must be aligned with the elbow access port 1202 to allow for a proper fitting of the injection tube 1289. The terminator access port 1290 can also be sealed by the use of a threaded plug (not shown). In addition to the fluidic communication, the embodiment of FIG. 12A provides electronic communication between the cable conductor 1293 and the terminating body 1376 via the terminator casing 1206.

Figure 13D:
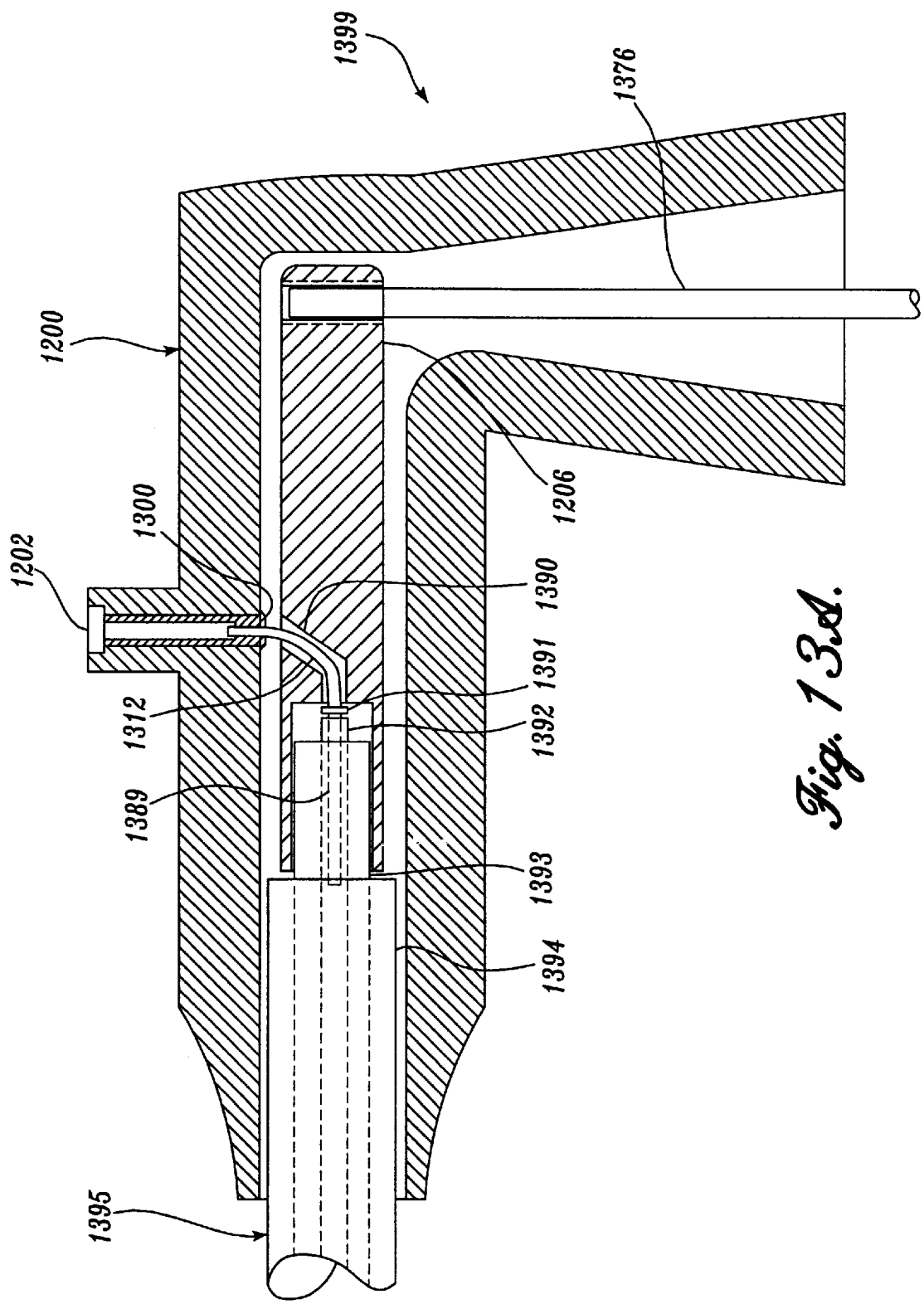
FIG. 13A is a sectional view of an assembled dead-front terminator configuration utilizing a flexible tubing.
FIG. 13B is a sectional view of a port insert used in the dead-front terminator shown in FIG. 13A.
FIG. 13C is a sectional view of a port insert assembly used in the dead-front terminator shown in FIG. 13A.

In another embodiment, the present invention provides a dead-front termination utilizing a tube to provide a contiguous flow path out of a dead-front termination. This embodiment allows a person to access the fluid conduits of a cable terminated by a dead-front termination via an extended flexible tubing, as shown in FIG. 13A. The construction of the terminator shown in FIG. 13A is similar to the construction of the terminator depicted in FIGS. 8A and 8B, where the tube can be made of any flexible, dielectric material sufficient to allow fluidic a communication at high pressures.

FIG. 13A is a sectional view of a cable connected to a dead-front terminator configuration with a flexible tube 1312 that is not bonded to the terminator housing 1206. In this embodiment, the flexible tube 1312 is connected to a port insert 1300 which is configured to allow for fluidic communication between the port insert 1300 and the cable conduit 1392. The flexible tube 1312 is bonded to the cable conduit 1392 in a manner similar to the embodiment of FIGS. 8A and 8B.

Figure 13B:
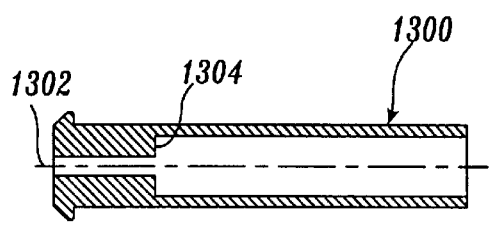
Figure 13C:
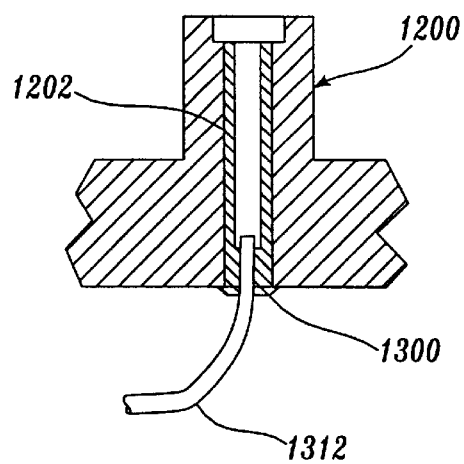

As illustrated in FIGS. 13A–13C, the port insert 1300 is bonded to the flexible tubing material 1391 and the tubing material 1391 is connected to a tube 1389 inserted in the conduit 1392. This configuration allows fluid and gas injection into the cable conduit through port nonconductive protective housing 1200. An external tubing (not shown) can be connected to the port opening 1202 by the use of a standard thread locking device or other like mechanisms. When the injection access is no longer needed, a threaded plug (not shown) may be inserted into the access port 1202.

FIG. 13C illustrates how a tube 1312 can be connected to an elbow port insert 1300. A variety of mechanical bonds are possible to attach the tube 1312 to the elbow port, including: a solvent weld, an adhesive bond, an interference fit, an o-ring-like seal, or a thermal weld. As shown in FIG. 13A–13C, for installation, the tube 1312 is first routed through the port 1390, cut to a predetermined length, and bonded to the port insert 1300 at the tip 1302.

Once the port insert 1300 is bonded and sealed to the tube 1312, the port insert 1300 is inserted into an injection elbow access port 1202 where it snaps into place with a permanent interference fit or other bonding techniques as illustrated above. The elbow access port 1310 is also depicted as the access port 1202 in FIG. 12A. A conventional injection cap or plug, or a permanent cap or plug, already known in the art is inserted into the inner cavity of the port insert to allow fluid injection. The routed access port alternative is compatible with all termination embodiments described above.

In addition to the methods described above, there are other ways to make physical flow connections for applying fluid to an injectable cable. Conventional injection elbows and adapters are described in U.S. Pat. No. 4,946,393 and 5,082,449, the disclosures of which are hereby incorporated by reference. As a non-limiting example, the conventional injection elbows and adapters could be applied at the cable ends and used to inject fluid into the cables. This approach introduces a significant limitation on the amount of pressure that a termination can withstand. For example, the prior art elbow and adapter designs hold about 30 to 40 PSI before they leak or deform. However, the dead-front embodiments shown and described above allow for injection pressures much greater than the prior art designs and therefore permit a much higher field application efficiency.

Figure 14:
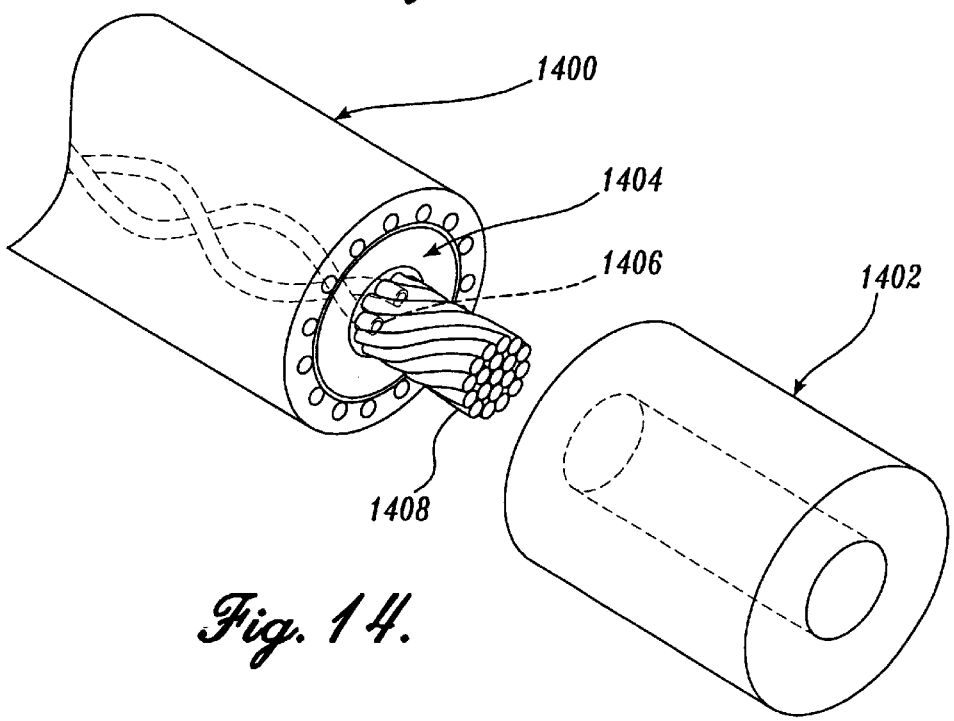
FIG. 14 is a perspective view of a flow-through cable with a shortened conduit.

If outside flow conduits are used exclusively for the injection, the conduits should be severed outside of the crimp or mechanical connector to facilitate flow as illustrated by FIG. 14. The method of cutting these outside tubes shorter than the strands is a novel way to facilitate flow for use with conventional molded, cold-shrink, hand-taped, and heat-shrink splices and conventional termination injection adapters.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for splicing a first flow-through cable and a second flow-through cable, wherein said first and second flow-through cable comprise a conduit, an electric conductive core, and an insulating material, wherein the method comprises:

(a) inserting a tubing material into said first flow-through cable;

(b) placing a connector over at least a portion of said first flow-through cable;

(c) fastening said connector to said first flow-through cable;

(d) inserting said tubing material into said second flow-through cable; and (e) fastening said connector to said second flow-through cable.

2. The method of claim 1, wherein said inserting steps (a) and (d) include inserting said tubing material into said conduit.

3. The method of claim 1, wherein said inserting steps (a) and (d) include inserting said tubing material into said conduit to a predetermined depth, wherein the predetermined depth reaches beyond a stripped portion of said insulating material.

4. The method of claim 1, further comprising:

attaching said tubing material to said conduit of said first flow-through cable; and attaching said tubing material to said conduit of said second flow-through cable.

5. The method of claim 1, further comprising:

stripping said insulating material from said first flow-through cable; and stripping said insulating material from said second flow-through cable.

6. The method of claim 1, wherein said first and second flow-through cables also include an insulation shield, a jacket, and a plurality of conduits, further comprising:

joining said plurality of conduits of said first flow-through cable with said plurality of conduits of said second flow-through cable.

7. The method of claim 6, wherein said plurality of conduits is positioned in said jacket.

8. The method of claim 1, wherein said tubing material is composed of steel.

9. A method for splicing a first flow-through cable and a second flow-through cable, wherein said first and second flow-through cable comprises a conduit, an electric conductive core, and an insulating material, comprising:

(a) stripping said insulating material from said first flow-through cable, thereby creating a first exposed electric conductive core;

(b) stripping said insulating material from said second flow-through cable, thereby creating a second exposed electric conductive core;

(c) placing a crimp connector over said first exposed electric conductive core of said first flow-through cable;

(d) inserting a tubing material into said conduit of said first flow-through cable;

(e) aligning said first flow-through cable and a second flow-through cable;

(f) withdrawing said tubing material out of said conduit of said first flow-through cable into said conduit of said second flow-through cable;

(d) sliding said crimp connector from said first exposed electric conductive core toward said second exposed electric conductive core, wherein said crimp connector is moved such that it covers said first conductive core and said second conductive core; and (e) crimping said crimp connector to said first and second exposed electric conductive core.

10. The method of claim 9, wherein said sliding step fiuther comprises sliding said crimp connector such that the center of said crimp connector is substantially aligned between said first and second exposed electric conductive core.

11. The method of claim 9, wherein said stripping of said first flow-through cable further comprises stripping said insulating material to a length equal to or greater than the length of said crimp connector.

12. The method of claim 9, wherein said first and second flow-through cables also include an insulation shield, a jacket, and a plurality of conduits, further comprising:

joining said plurality of conduits of said first flow-through cable with said plurality of conduits of said second flow-through cable.

13. The method of claim 12, wherein said plurality of conduits is positioned in said jacket.

14. The method of claim 9, wherein said tubing material is composed of steel.

15. A method for splicing a first flow-through cable and a second flow-through cable utilizing a two-part crimp connector, wherein said two-part crimp connector includes a first crimp part and a second crimp part, and wherein said first and second flow-through cable comprises a conduit, an electric conductive core, and an insulating material, comprising:

(a) placing said first crimp part over said electric conductive core of said first flow-through cable;

(b) placing said second crimp part over said electric conductive core of said second flow-through cable;

(c) inserting a tubing material into said conduit of said first flow-through cable;

(d) withdrawing said tubing from said conduit of said first flow-through cable into said conduit of said second flow-through cable;

(e) joining said first and second crimp part, thereby creating a crimp joint; and (f) crimping said first and second crimp part to said electric conductive core of said first and second flow-through cable.

16. The method of claim 15, further comprising crimping said crimp joint.

17. The method of claim 15, wherein said first and second crimp parts include a threaded grove, said threaded grove creates a secured connection between said first and second crimp part.

18. The method of claim 15, further comprising:

stripping said insulating material from said first flow-through cable; and stripping said insulating material from said second flow-through cable.

19. The method of claim 15, wherein said withdrawing step (d) includes withdrawing tubing from said conduit of said first flow-through cable until the center of said tubing material is substantially centered between said first and second flow-through cable.

20. The method of claim 15, wherein said first and second flow-through cables also include an insulation shield, a jacket, and a plurality of conduits, further comprising:

joining said plurality of conduits of said first flow-through cable with said plurality of conduits of said second flow-through cable.

21. The method of claim 20, wherein said plurality of conduits is positioned in said jacket.

22. The method of claim 15, wherein said tubing material is composed of steel.

23. A cable assembly for a flow-through cable, wherein said flow-through cable comprises a conduit, an electric conductive core, and an insulating material surrounding said conduit and electric conductive core, comprising:
- a tubing material, wherein said tubing material is inserted into said conduit allowing fluidic communication between said tubing material and said conduit; and
- a conductive housing having a first cavity and a second cavity, the second cavity sized to receive an end portion of said electric conductive core, said first cavity extending from internal surface of said second cavity to the external surface of the conductive housing, said first and second cavities are coupled for allowing fluidic communication said tubing material and said second cavity.

24. The cable assembly of claim 23, further comprising a second tubing material, wherein said second tubing material is connected to said tubing material for providing fluidic communication between said conduit and said second tubing material, said second tubing material configured to extend from said tubing material to the exterior of the conductive housing via said first cavity.

25. A cable assembly for a flow-through cable, wherein said flow-through cable comprises a plurality of conduits, an electric conductive core, and an insulating material surrounding said plurality of conduits and electric conductive core, comprising:
- a tubing material;
- a hollowed plug assembly, wherein said hollowed plug assembly comprises of a plurality of substantially rigid tubes and a tubing connector, individual tubes of said plurality of rigid tubes are positioned in individual conduits of said plurality of conduits, said plurality of substantially rigid tubes and said tubing connector provide fluidic communication from said plurality of conduits to said tubing material; and
- a conductive housing having a first cavity adapted to receive said tubing material and a second generally cylindrical cavity to receive an end portion of said electric conductive core, said second generally cylindrical cavity and said first cavity are adapted to allow said electric conductive core and said tubing material to connect within said conductive housing.

26. The cable assembly of claim 25, further comprising a locking means for retaining said electric conductive core to said conductive housing.

27. The cable assembly of claim 26, wherein said plurality of said tubing connectors is arranged on said hollowed plug assembly such that each tubing connector of said plurality of said tubing connector is substantially aligned with plurality of conduits of said flow-through cable.

28. A cable assembly for a flow-through cable having a conduit, an electric conductive core, and an insulating material, comprising:
- a conductive housing having a first cavity, a second cavity to receive an end portion of said electric conductive core, a tubing material rigidly attached to the base of said second cavity, said tubing material substantially aligned with the axis of said second cavity, said tubing material attached to said first cavity to allow fluidic communication between said tubing material and said first cavity, wherein the length of said tubing material is configured to extend through the length of the second cavity.

29. The cable assembly of claim 28, wherein the length of said tubing material is longer than the length of said second generally cylindrical cavity.

30. The cable assembly of claim 28, wherein said tubing material is constructed with a rigid metal material.

31. A cable assembly for a flow-through cable having a plurality of conduits, an electric conductive core, and an insulating material, comprising:
- a conductive housing having a first cavity, a second cavity to receive an end portion of said electric conductive core, a plurality of tubes rigidly attached to the base of said second cavity, said plurality of tubes substantially aligned with the axis of said cavity, said plurality of tubes attached to base said first cavity to allow fluidic communication between said plurality of tubes and said first cavity.

32. The cable assembly of claim 31, wherein said plurality of tubes are constructed with a rigid metal material.

33. The cable assembly of claim 31, wherein the length of said plurality of tubes is greater than the length of said second generally cylindrical cavity.

34. The cable assembly of claim 31, wherein said first cavity is of a cylindrical shape with a threaded surface facing the inside of the cavity.

35. A cable assembly for a flow-through cable, wherein said flow-through cable comprises a conduit, an electric conductive core, an insulating material, an insulation shield, and a jacket, comprising:
- a conductive housing having a first and second open end, wherein said first open end is adapted to receive said electric conductive core of said flow-through cable, wherein said second open end is adapted to receive a tubing material, and wherein said first and second opening allow fluidic communication between said tubing material and said electric conductive core.

36. A cable assembly for a flow-through cable having an electric conductive core configured to allow fluidic communication therethrough, and an insulating material surrounding the electric conductive core, comprising:
- a conductive housing having a first cavity and a second cavity, the first cavity extends from the second cavity to at least one exterior surface of the conductive housing, the second cavity is sized to receive an end portion of said electric conductive core, said conductive housing configured to allow fluidic communication between the first and second cavity, and wherein the conductive housing is configured to allow fluidic communication between the electric conductive core and the first cavity.

37. A cable assembly for a flow-through cable, wherein said flow-through cable comprises a conduit, an electric conductive core, and an insulating material, comprising:
- a tubing material, wherein said tubing material is inserted into said conduit allowing fluid passage from said tubing material to said conduit; and
- a conductive housing having a first cavity adapted to receive said tubing material and a second cylindrical cavity to receive an end portion of said electric conductive core, said second cylindrical cavity is coupled to said first cavity thereby allowing fluidic communication between said second cylindrical cavity and said first cavity.

38. The cable assembly of claim 37, further comprising a second tubing material, wherein said second tubing material is connected to said tubing material providing fluidic communication between said conduit and said second tubing material.

39. A cable apparatus for splicing a first flow-through cable and a second flow-through cable, wherein said first and second flow-through cable comprise a conduit, an electric conductive core, and an insulating material, the cable apparatus comprising:

(a) a tubing material inserted into said conduit of said first and second flow-through cable; and (b) a crimp connector placed around said conductive core of said first and second flow-through cable, wherein the crimp connector is configured to affix said first and second flow-through cable such the that said cable apparatus provides fluidic and electronic communication between first and second flow-through cable.

40. A method for terminating a flow-through cable, wherein said flow-through cable comprises a conduit, an electric conductive core, and a surrounding insulating material, wherein the method comprises:

stripping said insulating material to a predetermined length, thereby exposing a portion of the electric conductive core; and cutting said conduit to a length such that said conduit does not extend into said exposed portion of the electric conductive core.

41. A cable apparatus for terminating a flow-through cable, comprising:

an electric conductive core surrounded by an insulating material, wherein said insulating material is cut back thereby defining a terminating end; and a conduit, wherein the conduit is positioned to allow fluidic communication to said electric conductive core, and wherein said conduit does not laterally extend past said terminating end of said flow-through cable.

* * * * *

UNITED STATES PATENT AND TRADEMARK OFFICE
CERTIFICATE OF CORRECTION

PATENT NO. : 6,489,554 B1
DATED : December 3, 2002
INVENTOR(S) : G.J. Bertini et al.

It is certified that error appears in the above-identified patent and that said Letters Patent is hereby corrected as shown below:

Title page,
Item [73], Assignee, "Utlix" should read -- UTILX --
Item [56], References Cited, insert:
-- OTHER PUBLICATIONS
Eager, Jr. et al. "Extending Service Life of Installed 15-35 KV Extruded Dielectric Cables," *IEEE Transactions on Power Apparatus and Systems, PAS-103*, (8): 1997-2005, Aug. 1984. --

Column 15,
Line 65, "(d) sliding" should read -- (g) sliding --

Column 16,
Line 3, "(e) crimping" should read -- (h) crimping --
Line 6, "fiuther" should read -- further --

Column 17,
Line 15, "from internal surface" should read -- from the internal surface --
Line 18, "communication said" should read -- communication between said --
Line 33, "comprises of a" should read -- comprises a --
Line 53, "aligned with plurality" should read -- aligned with said plurality --

Column 18,
Line 14, "to base said" should read -- to the base of said --
Line 60, "cavity thereby" should read -- cavity, thereby --

Column 19,
Line 11, "such the that" should read -- such that --
Line 13, "between first" should read -- between said first --

UNITED STATES PATENT AND TRADEMARK OFFICE
CERTIFICATE OF CORRECTION

PATENT NO. : 6,489,554 B1
DATED : December 3, 2002
INVENTOR(S) : G.J. Bertini et al.

It is certified that error appears in the above-identified patent and that said Letters Patent is hereby corrected as shown below:

<u>Column 20,</u>
Line 10, "cut back" should read -- cut back, --

Signed and Sealed this

Eighth Day of June, 2004

JON W. DUDAS
*Acting Director of the United States Patent and Trademark Office*